INVENTORS.
RICHARD B. ERNEST
KENNETH A. SWANSTROM
BY Denny and Denny
THEIR ATTORNEYS.

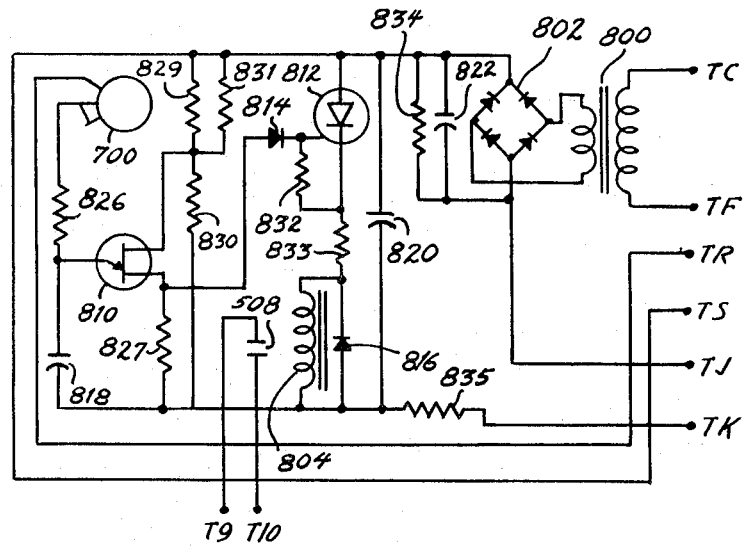
Fig. 7.
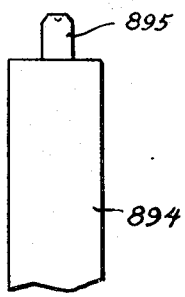
Fig. 17.
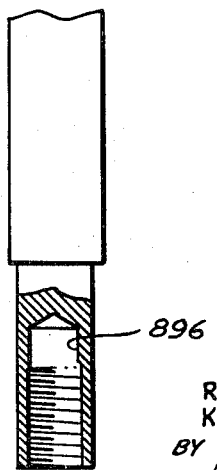
INVENTORS.
RICHARD B. ERNEST
KENNETH A. SWANSTROM
BY Denny and Denny
THEIR ATTORNEYS.

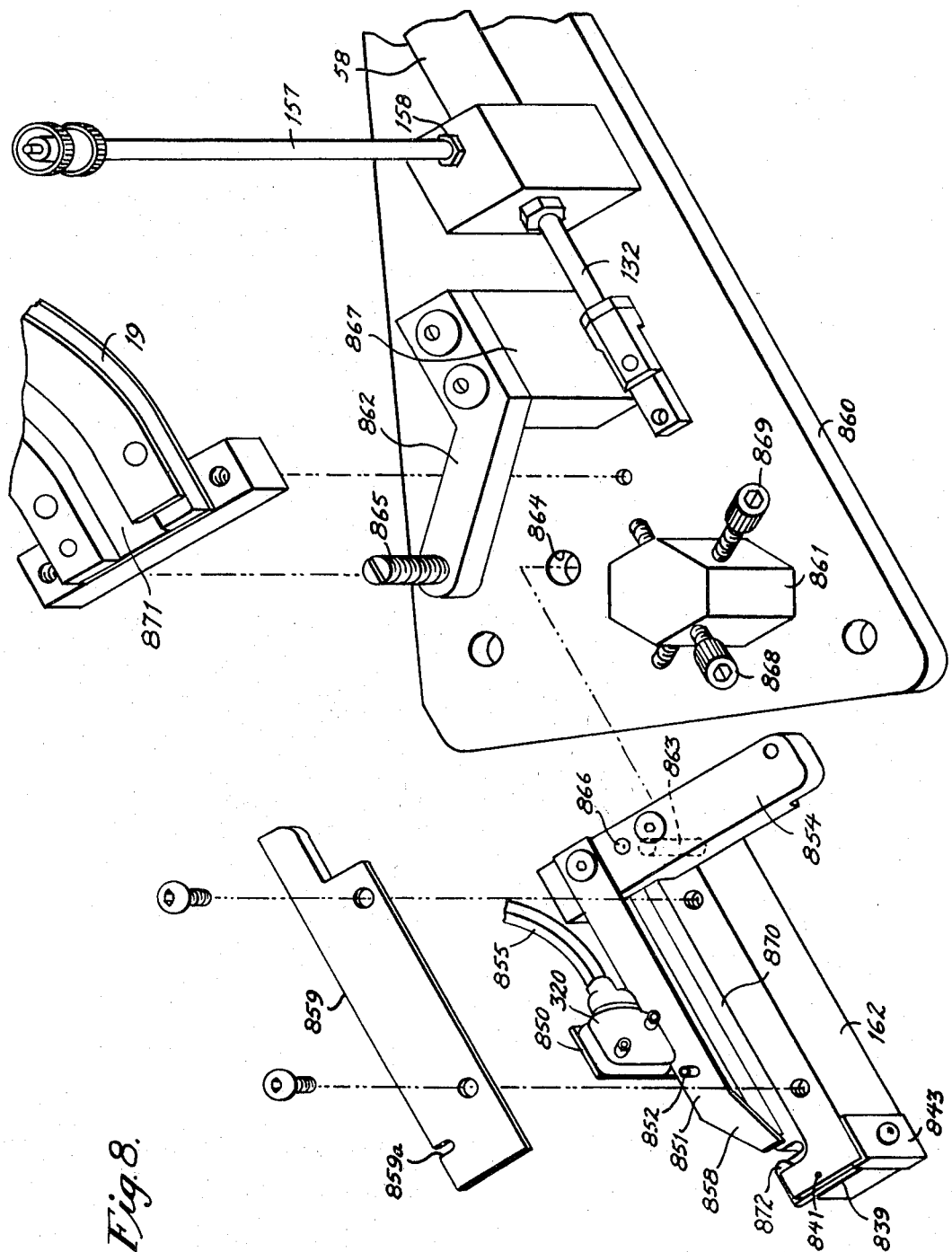

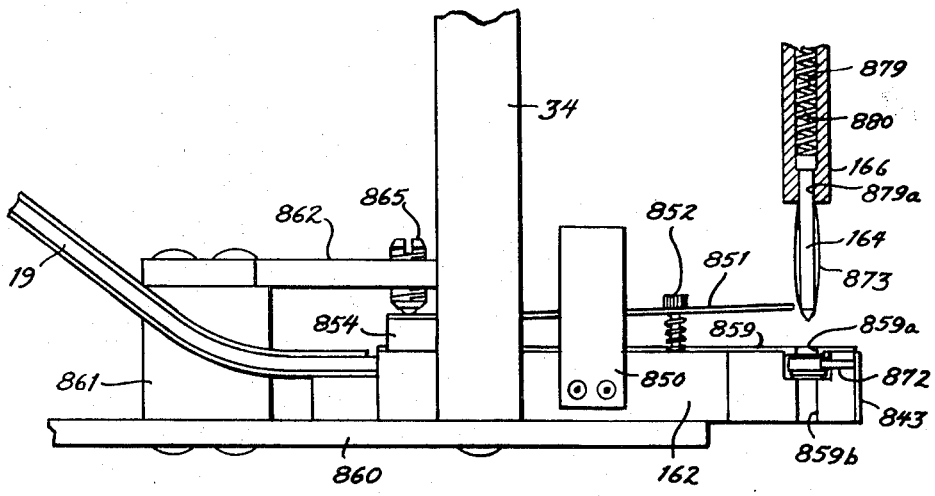
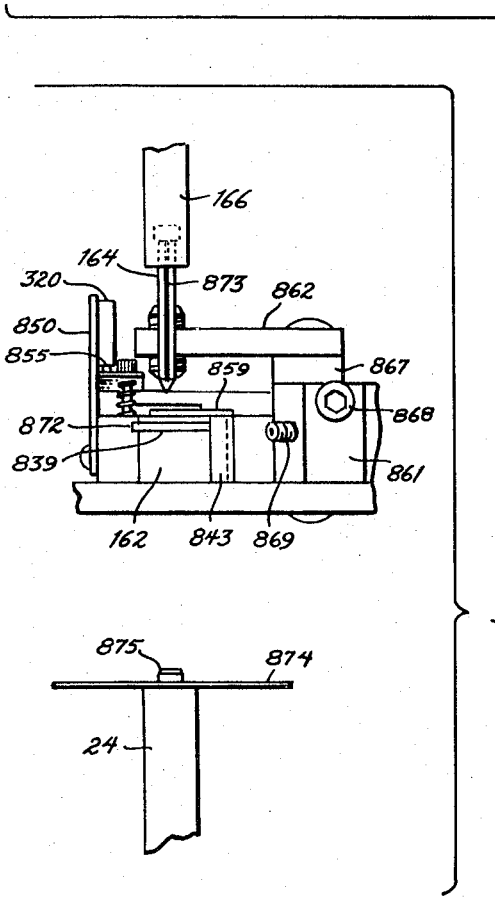
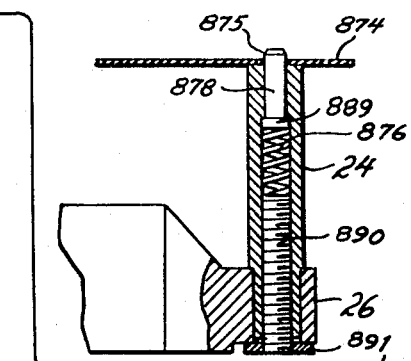
Fig. 10.
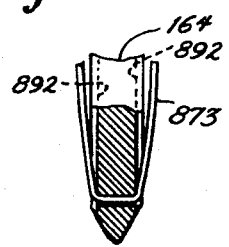
Fig. 9.
Fig. 53.
INVENTORS.
RICHARD B. ERNEST
KENNETH A. SWANSTROM
THEIR ATTORNEYS.

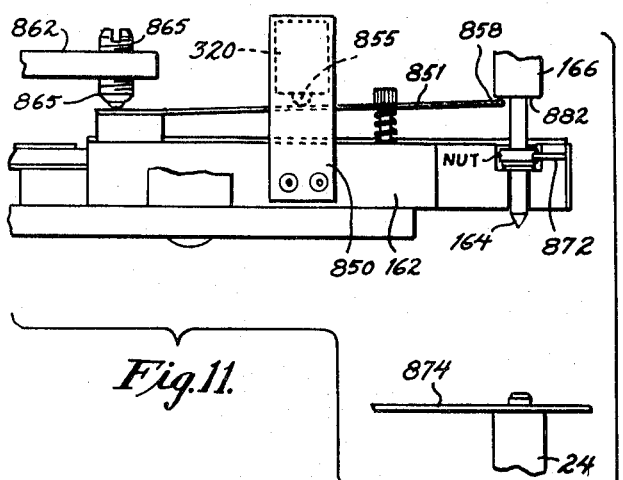
Fig.11.
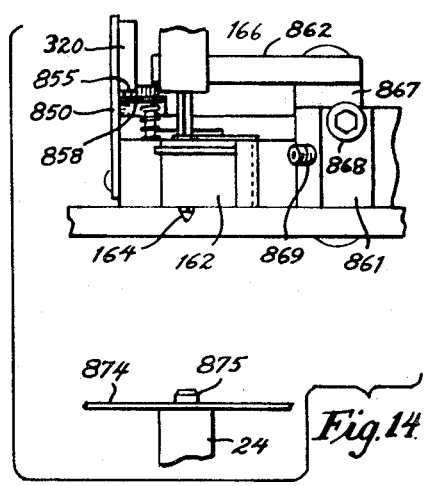
Fig.14.
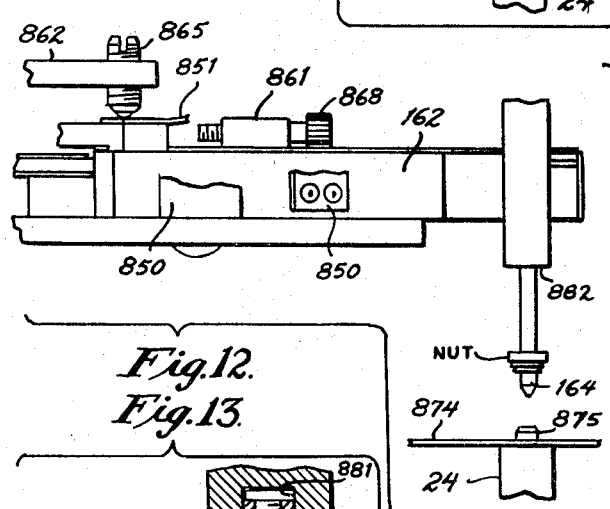
Fig.12.
Fig.13.
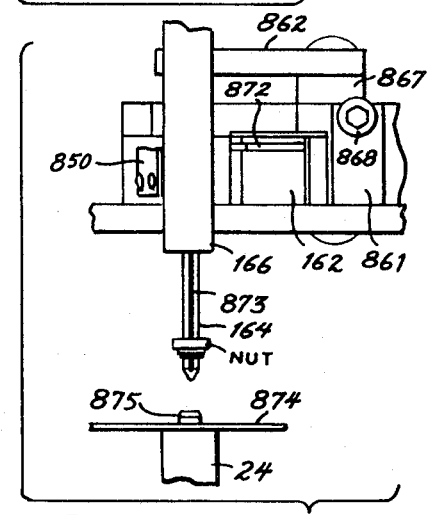
Fig.15.
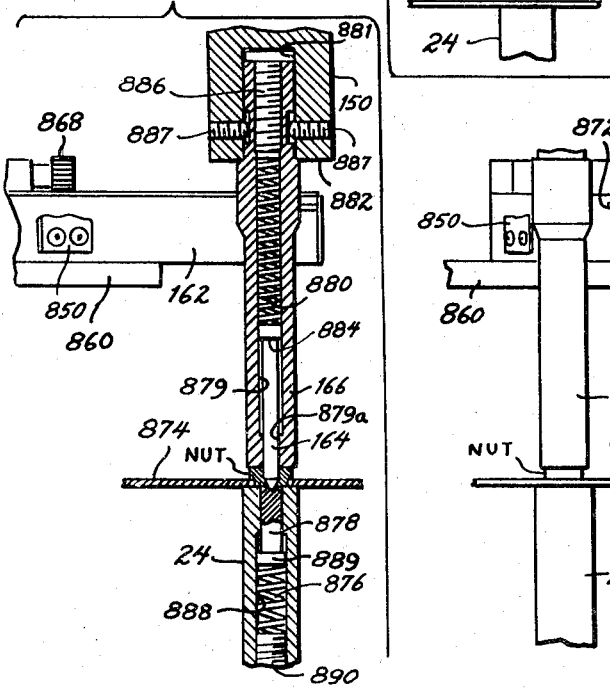
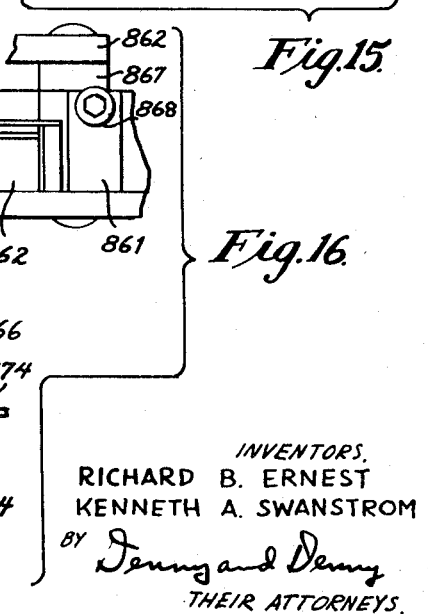
Fig.16.
INVENTORS.
RICHARD B. ERNEST
KENNETH A. SWANSTROM
BY Denny and Denny
THEIR ATTORNEYS.

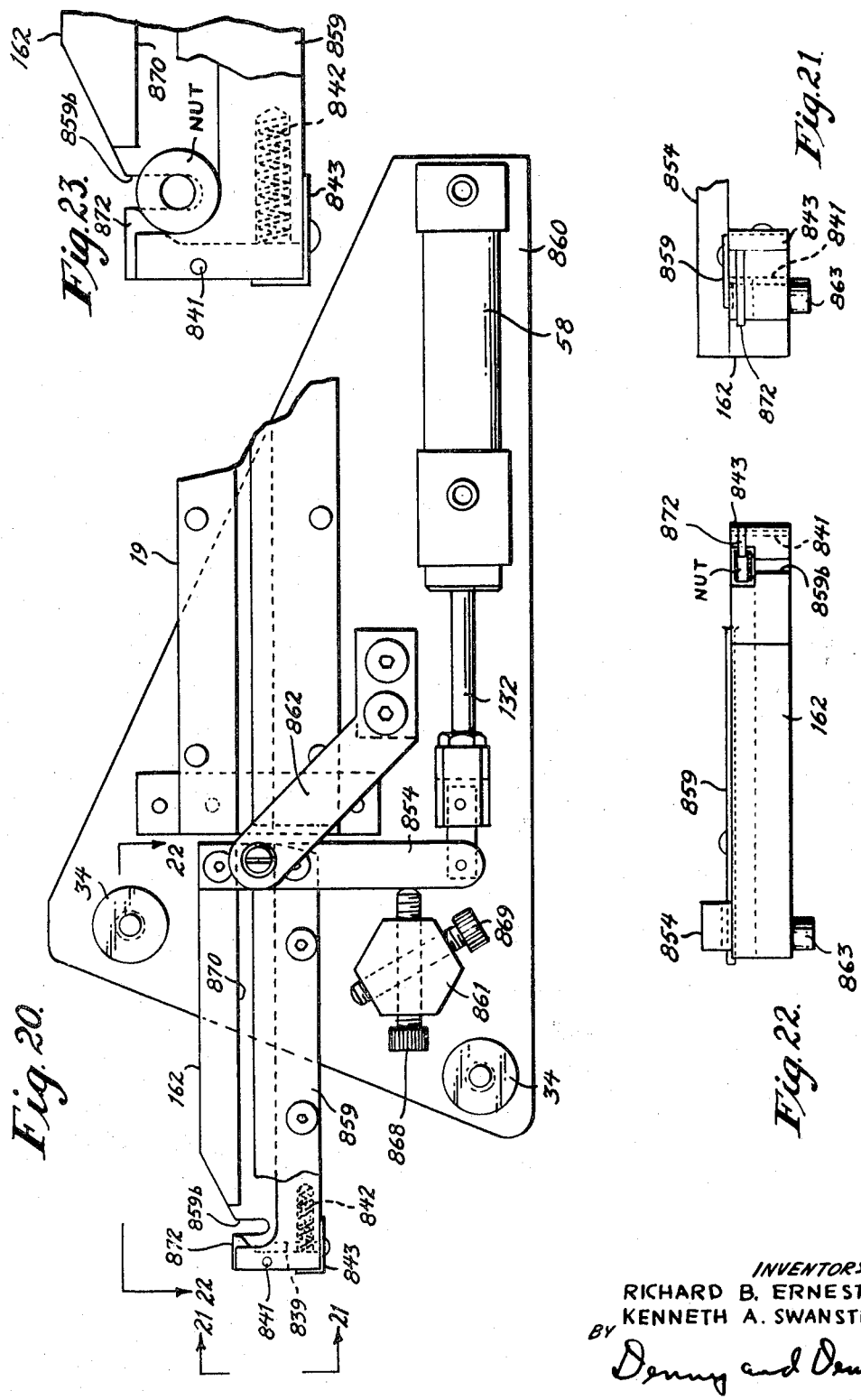

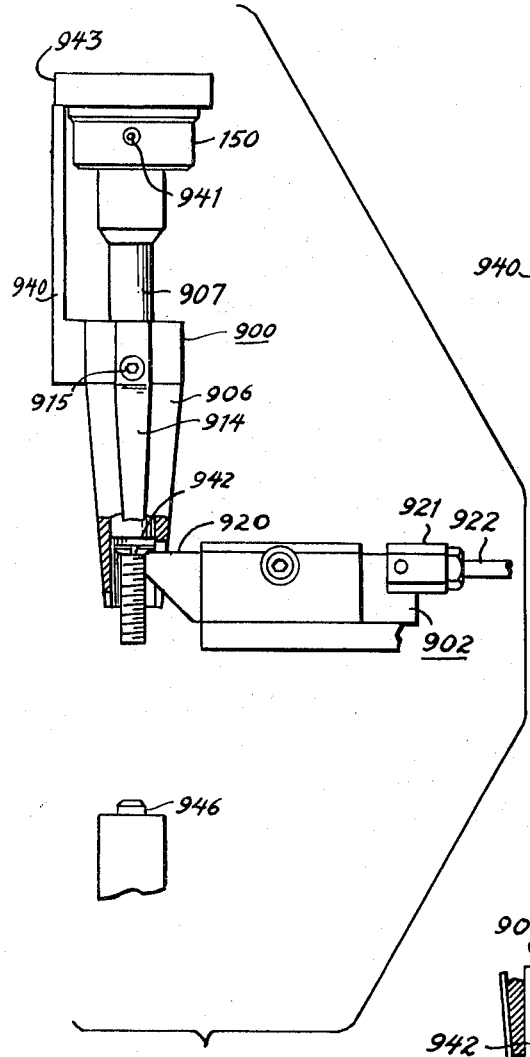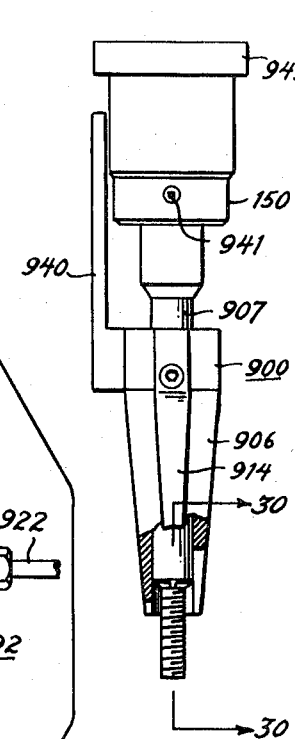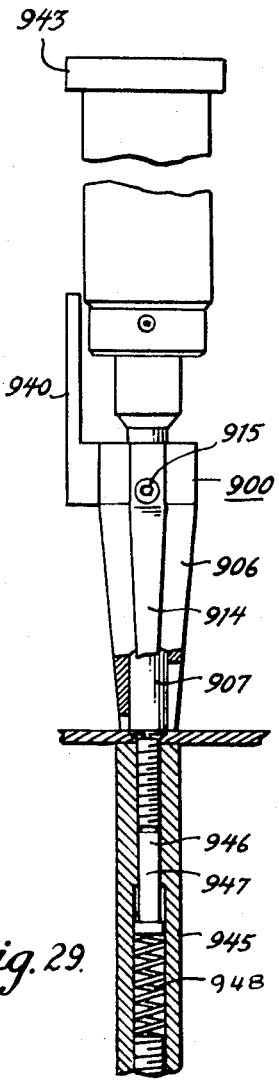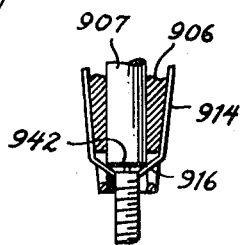

Sept. 9, 1969        R. B. ERNEST ET AL         3,465,410
       AUTOMATED MACHINE OR PRESS FOR ASSEMBLING
                 A FASTENER TO A WORKPIECE
Filed March 8, 1967                    14 Sheets-Sheet 14

INVENTORS.
RICHARD B. ERNEST
KENNETH A. SWANSTROM
BY Denny and Denny
THEIR ATTORNEYS.

United States Patent Office 3,465,410
Patented Sept. 9, 1969

3,465,410
AUTOMATED MACHINE OR PRESS FOR ASSEM-
BLING A FASTENER TO A WORKPIECE
Richard B. Ernest, Richboro, and Kenneth A. Swanstrom,
Doylestown, Pa., assignors to Penn Engineering and
Manufacturing Corporation, Doylestown, Pa., a corpo-
ration of Delaware
Filed Mar. 8, 1967, Ser. No. 621,647
Int. Cl. B23p 19/04; B23q 7/10
U.S. Cl. 29—208                                    19 Claims

ABSTRACT OF THE DISCLOSURE

This invention relates to a pneumatic and hydraulic assembling machine or press for semiautomatically installing self-clinching fasteners, such as nuts and studs, to a sheeted plate, usually a sheet metal and hereinafter referred to as the workpiece, in which the fastener is carried to the workpiece by a punch assembly exerting a relatively low force and thereafter a higher force is exerted, of short duration, by the punch assembly to clinch the fastener to the workpiece.

BACKGROUND OF THE INVENTION

For best results, in the installation of self-clinching fasteners, a squeezing force should be applied to the fastener between parallel planes. For many years these fasteners have been installed by hand arbor presses, pneumatic presses, hydraulic presses, and mechanical presses by manually placing the fastener in the hole in the workpiece and pressing on it with appropriate tooling.

As one example, machinery intended primarily to set rivets has been adapted to semiautomatically install self-clinching fasteners. One inherent disadvantage of this rivet setting machinery, when adapted to install these fasteners, is that the rivet setting machinery relies primarily on an impact force to set the fastener, whereas for best results, in our opinion, self-clinching fasteners should be squeezed into place. Thus, while semitubular rivets can be flared or curled by impact almost instantaneously, the displacement of the workpiece material which is required to properly secure self-clinching fasteners probably does not take place instantaneously, except possibly with smaller size fasteners, in our opinion.

Further, in a rivet setting machine, the force exerted by the punch is not usually adjustable. Usually the force in such machines is dictated by a mechanical linkage which cannot be readily changed.

BRIEF SUMMARY OF THE INVENTION

It is an object of this invention to provide a pneumatic and hydraulic assembling machine or press whereby the fastener is carried to the workpiece by a punch assembly exerting a relatively low force and thereafter clinching the fastener to the workpiece by having the punch exert a higher force of short duration.

Another object of this invention is to regulate the forces to be exerted by the punch by air regulators.

A further object is to provide punch and anvil assemblies in which the length of the punch stroke is limited by the anvil, various length, replacable anvils being provided, and the punch stopping when resisted by the fastener and the workpieces, assuming that the high force has been preset so as to be sufficient to clinch the fastener to the workpiece without damaging either.

A still further object of this invention is to provide electrical timing means whereby the low force advance of the punch assembly can be utilized for the entire punch stroke and then the higher force is introduced to the punch, or preferably the higher force can be introduced to the punch before it completes its full stroke to thereby shorten the overall stroke of the punch, when desired.

A still further object of this invention is to provide electrical timing means for controlling the punch travel time, the time the higher force is exerted by the punch, and for regulating the position of the fastener feed gate assembly relative to the punch.

A still further object of this invention is to minimize the consumption of air by providing means for utilizing the higher pressure air only for the portion of the punch stroke required to exert the higher punch force and utilizing lower pressure air to otherwise advance and retract the punch, and providing an adjustable anvil to be set as close to the punch as is permissible, allowing for the workpiece and the fastener, which also shortens the stroke of the punch and further reduces air consumption.

In one embodiment of our invention we provide an assembling machine for assembling a fastener in a hole in a workpiece comprising a punch assembly and an anvil assembly carried by a frame. A first hydraulic and pneumatic means is used to advance and retract the punch assembly with a first force while holding and placing said fastener in said hole in said workpiece. A second hydraulic and pneumatic means is used to apply a second force, higher than the first force, to the punch assembly during the end portion of the advance of the punch assembly to clinch the fastener in the hole in the workpiece.

The assembly machine or press is semiautomatic in the sense that the operator is required to move the workpiece after a fastener is installed.

The foregoing and other objects of this invention, the principles of this invention, and the best modes in which we have contemplated applying such principles will more fully appear from the following description and accompanying drawings in illustration thereof.

In the drawings:

FIGS. 5, 6 and 7 are diagrammatic views of the internal circuits of the three timers;

FIG. 8 is an exploded, perspective view of a portion of the fastener feed tract and of the gate assembly;

FIG. 9 is a partial front view prior to initiation of a cycle;

FIG. 10 is a partial side view taken from the left hand side in FIG. 9;

FIGS. 11, 12 and 13 are side views taken on the same side as FIG. 10 but showing successive steps;

FIGS. 14, 15 and 16 are front views corresponding to FIGS. 11, 12 and 13, respectively;

FIG. 17 illustrates an anvil for nut installation to the under surface of the workpiece;

FIG. 20 is a top view of the gate assembly, showing a portion of the track and the gate actuating cylinder;

FIGS. 21 and 22 are front and side views of the gate taken along the lines 21—21 and 22—22, respectively, in FIG. 20;

FIG. 23 is a partial, top enlarged view of the forward end of the gate shown in FIG. 20.

Figure 24:
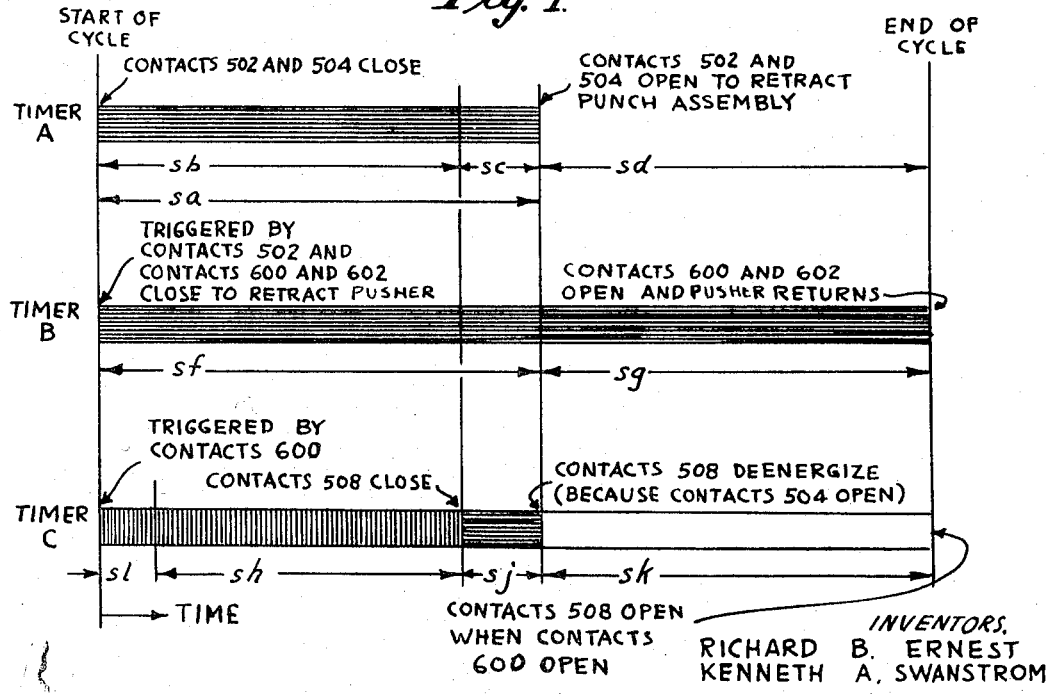
Figure 25:
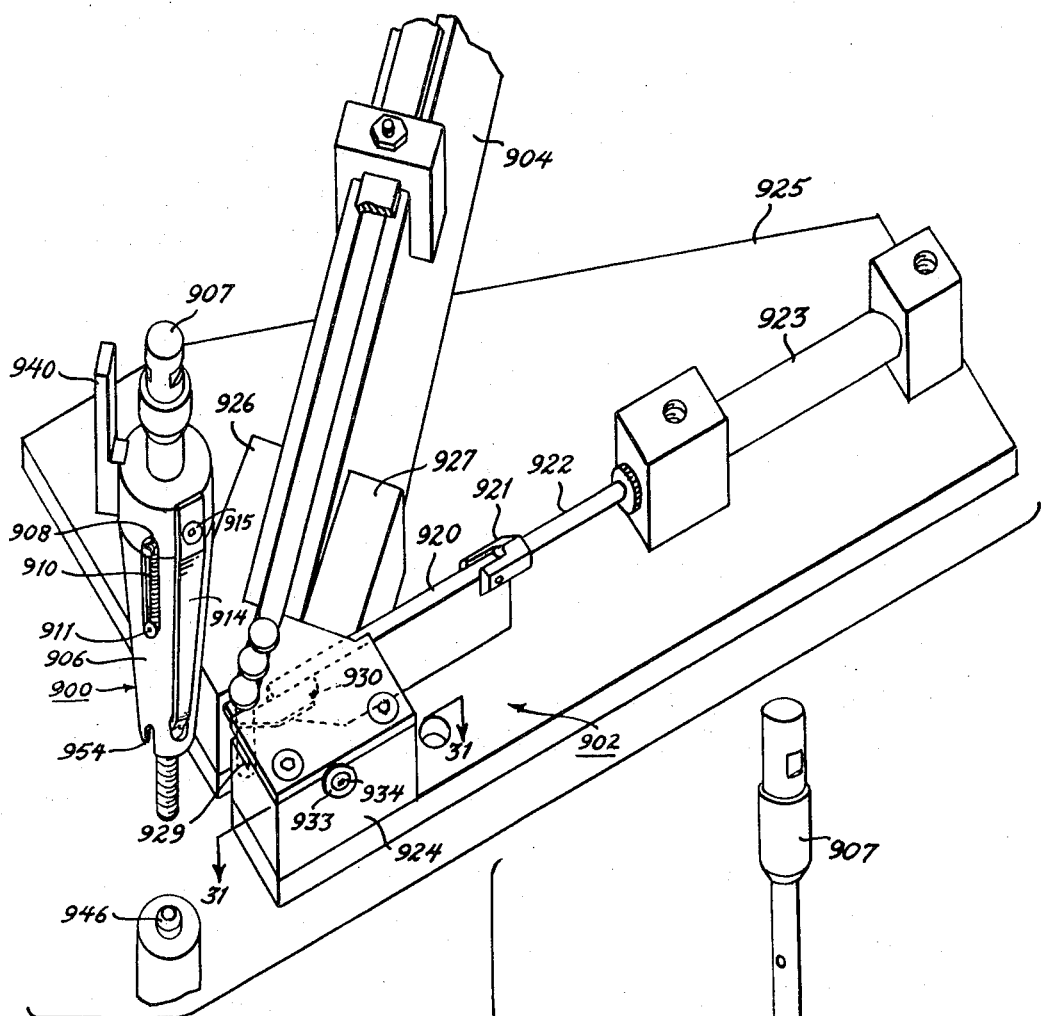
Figure 26:
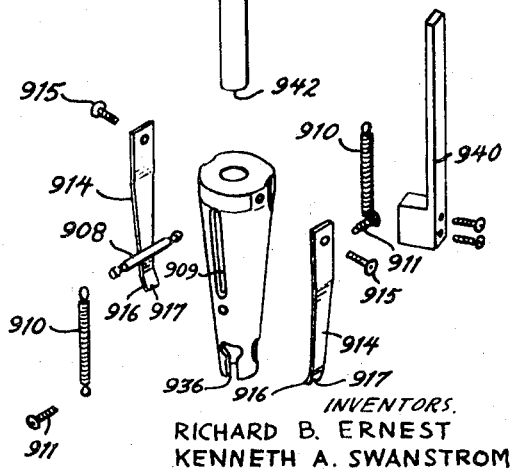
Figure 31:
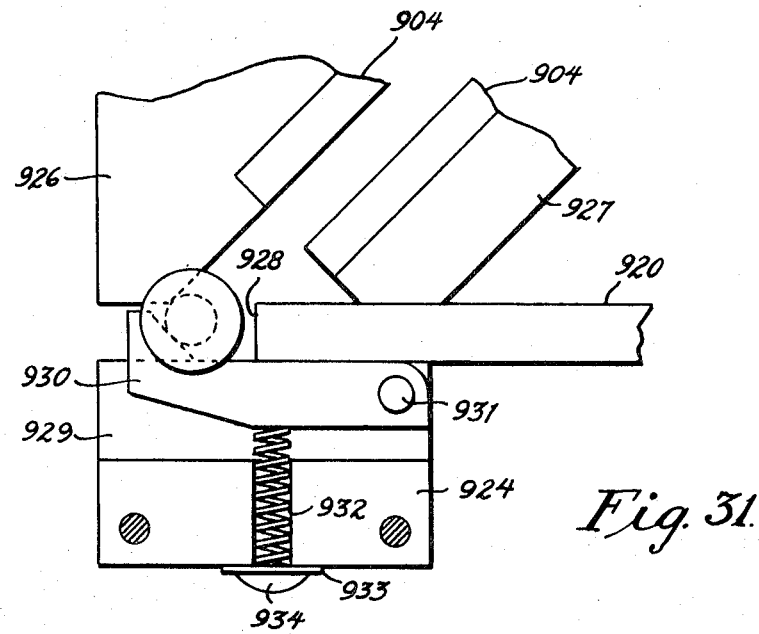
Figure 32:
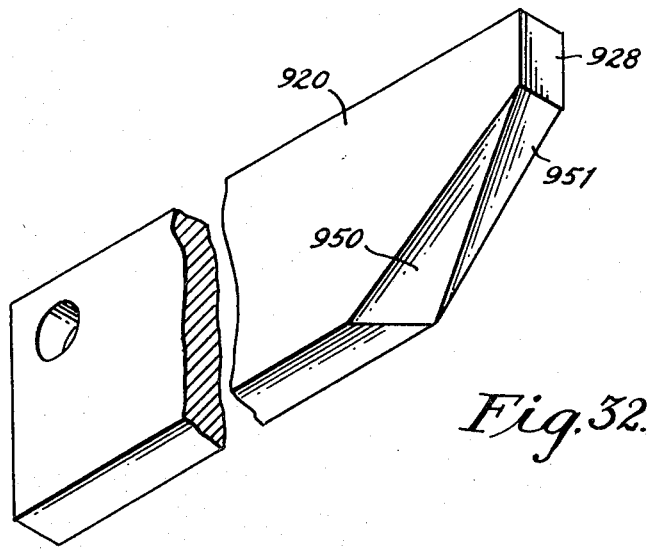

FIG. 24 is a time diagram for stud installation to the upper surface of the workpiece;

FIG. 25 is a perspective view of the punch assembly, anvil assembly, stud pusher assembly, and a portion of the track for the feeding of studs;

FIG. 26 is an exploded, perspective view of the punch assembly shown in FIG. 26, but taken from the back, relative to the view shown in FIG. 26;

FIGS. 27, 28 and 29 are views showing the sequence of installation of a stud;

FIG. 30 is a cross-sectional view taken along the line 30—30 in FIG. 28;

FIG. 31 is a partial, top view taken along the line 31—31 in FIG. 25;

FIG. 32 is a perspective view of the pusher; and

FIG. 33 is a partial, enlarged view, mostly in cross-section, of the forward portion of the punch pilot shown in FIG. 10.

Figure 1:
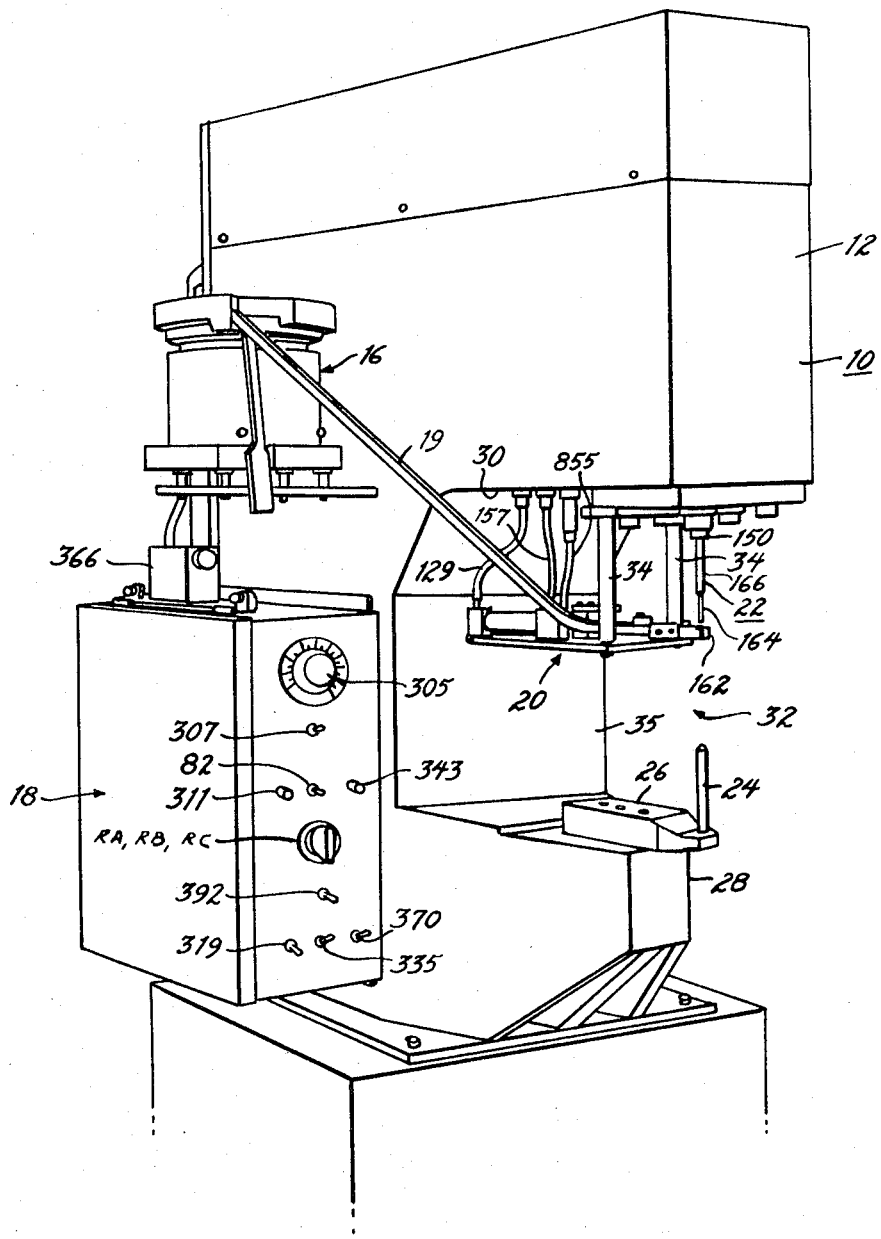
FIG. 1 is a front perspective view of the automated press constructed in accordance with this invention showing the side on which the feed hopper assembly and the electrical control unit are mounted.

Referring to FIG. 1, the press or assembly machine 10 comprises a generally upright frame 12. The press 10 includes a pneumatic and hydraulic circuit 14, shown diagrammatically in FIG. 2. As illustrated, in FIG. 1, fastener feed hopper assembly 16 is secured to one side of the frame 12, as is also an electrical control unit 18, shown diagrammatically in FIG. 3.

The fastener feed hopper assembly 16 includes a track 19 for delivering to the gate assembly 20 a fastener positioned below a punch assembly 22 which is, in turn, to be delivered by the punch assembly 22 to the workpiece, not shown in FIG. 1, but intended to rest upon an anvil 24 carried by an anvil holder 26 which is suitably secured to the lower jaw 28 of the press.

The gate assembly 20 is suspended from the roof 30 of the mouth 32 of the press by columns 34 which are suitably secured to the roof 30, a rear wall 35 defining the back of the mouth 32.

Figure 2:
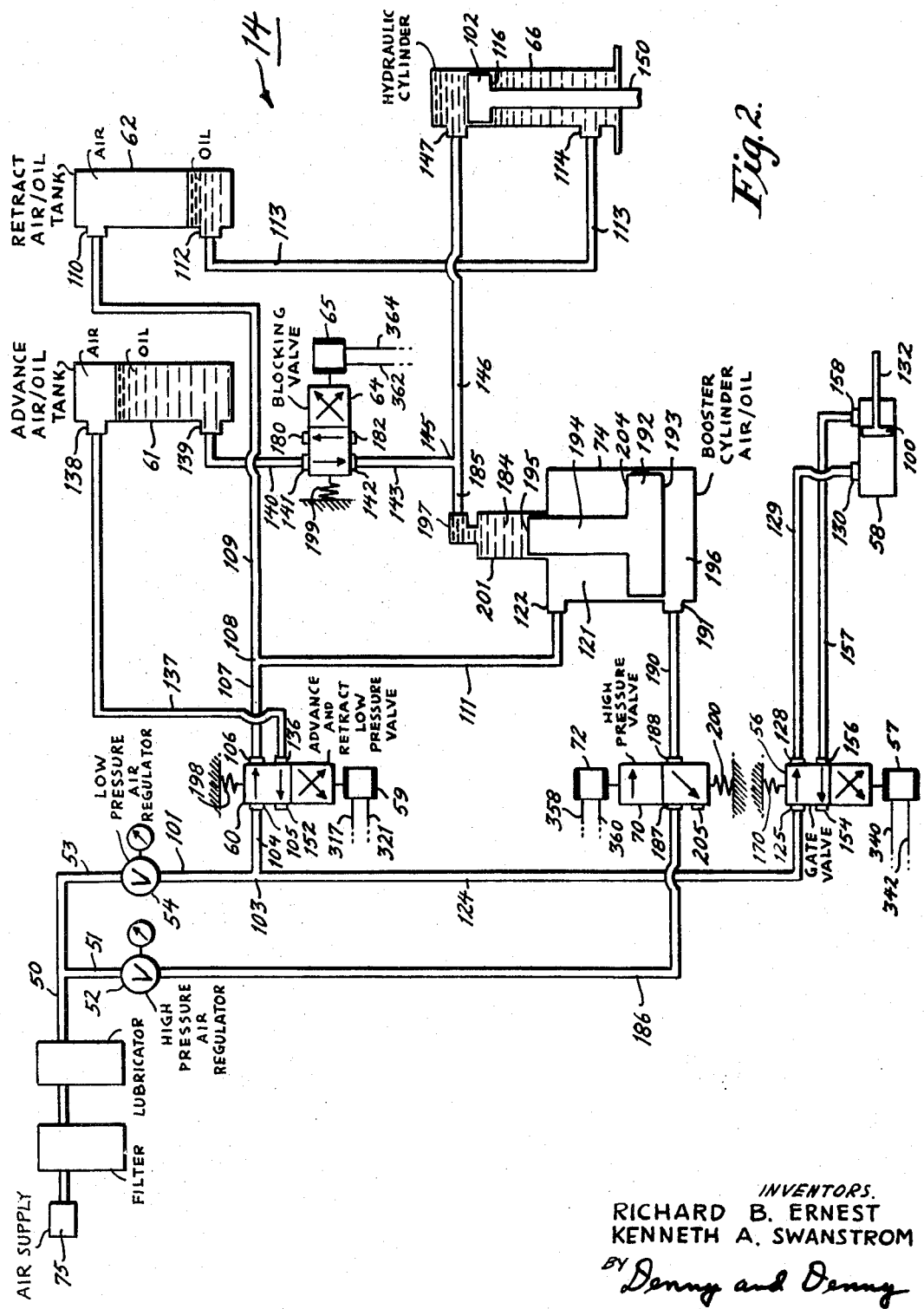
FIG. 2 is a diagrammatic view of the pneumatic and hydraulic circuit showing a portion of the electrical circuit.

The press 10 is actuated by the pneumatic and hydraulic circuit 14 which, referring to FIG. 2, comprises a supply pipe 50 connected to a suitable source of compressed air for supplying air through branch pipe 51 to a high pressure regulator 52 and through a branch pipe 53 to a low pressure regulator 54.

The low pressure regulator 54 is connected, by suitable pipes, hereinafter described in further detail, to a four-way valve 56, controlled by a solenoid 57, and to a cylinder 58 which actuates the gate assembly 20.

The low pressure regulator 54 is also connected, by suitable pipes, hereinafter described in further detail, to a four-way valve 60, controlled by a solenoid 59, to a tank 61 for advancing the punch assembly under a low force or to a tank 62 for retracting the punch assembly 22 under a low force, the advance tank 61 being connected through a valve 64, controlled by a solenoid 65, to the upper end, FIG. 2, of the hydraulic cylinder 66 which actuates the punch assembly 22, whereas the hydraulic portion of the retract tank 62 is directly connected to the lower end of the hydraulic cylinder 66.

The high pressure air regulator 52 is connected, by suitable pipes, hereinafter referred to in further detail, to a valve 70, controlled by a solenoid 72, the valve 70 being connected to the hydraulic booster cylinder 74 which is in turn connected to the upper end, as viewed in FIG. 2, of the hydraulic cylinder 66, for applying a high force to the punch assembly 22.

Figure 3:
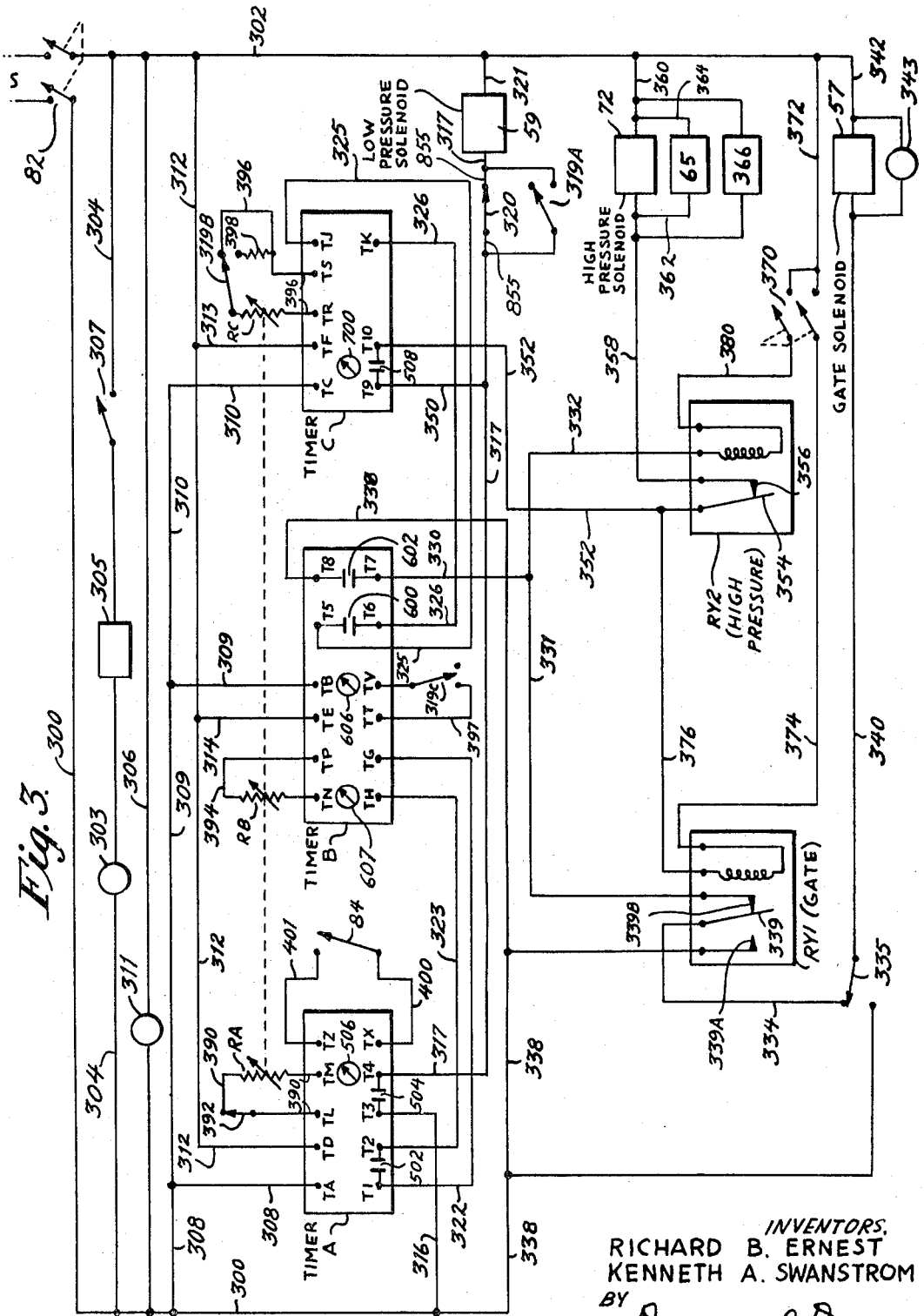
FIG. 3 is a diagrammatic view of the electrical circuit.

Referring to the wiring diagram, FIG. 3, assuming that the press has been set up with a particular punch assembly 22 and a particular anvil assembly 24 suitable for the fastener to be inserted, the press is energized by assuring that the pipe 50 is connected to a suitable air supply 75 and the closing of the two-pole, single throw main switch 82, thereby making electrical power available to three electrical timers A, B, and C which control the solenoids 57, 59, 65 and 72.

The advance-retract low pressure air regulator 54 is now adjusted to a suitable air pressure, in one embodiment 50 pounds per square inch gage (p.s.i.g.). The low pressure air regulator 54 is preset at this pressure at the time the machine is manufactured, and it is contemplated that thereafter it need not be changed.

The high pressure air regulator 52 is likewise adjusted by the operator to the gage setting required to clinch a particular fastener, i.e., a nut (or a stud), assuming that this high pressure regulator setting has been predetermined.

The pneumatic and hydraulic circuit

FIGS. 1, 2 and 3 illustrate the press, the pneumatic and hydraulic circuit, and the wiring diagram in the position just prior to starting a cycle, i.e., the pipe 50 connected to a suitable supply of air, the main switch 82 just before it is closed, and the foot switch 84 open. At this time the track 19 of the feed hopper assembly 16 is full of the proper fasteners, and the piston 100 of the cylinder 58 is in its advanced position, while the pistons 102 and 192 of the cylinders 66 and 74, respectively, are in their retracted positions, all of the pistons having been returned to their positions at the end of the previous cycle.

To advance or to retract the punch assembly 22, but usually not to clinch the fastener to the workpiece, the piston 102 is actuated by oil under low pressure, the oil being pressurized by low pressure air. More particularly, low pressure air is supplied from the low pressure regulators 54, pipe 101, T-connector 103, pipe 104, and port 105 through the advance-retract valve 60, to port 106 thereof, pipe 107, T-connector 108, pipe 109 and into upper port 110 of the retract air and oil tank 62. This air applies pressure to the oil in the tank 62 forcing it out of the port 112 thereof, through the pipe 113, into the lower port 114 of the hydraulic cylinder 66. The oil in the cylinder 66 now applies a force to the underside 116 of the piston 102 to hold it in the retracted position, i.e., its upper position, as shown in FIG. 2.

Simultaneously, by virtue of the T-connector 108, and pipe 111, low pressure air is supplied, to the upper port 122 of the hydraulic booster cylinder 74 and the air chamber 121. This applies air to the top surface 204 (as viewed in FIG. 2) of the large piston 192 holding it in the retracted (lower) position, as shown. Also, low pressure air is supplied by the low pressure air regulator 54 from the T-connector 103, and through the pipe 124 to the port 125 of the four-way valve 56. From the valve 56 air is supplied through port 128 thereof, pipe 129, to the left port 130 of the gate cylinder 58. Thus, low pressure air is applied to the left hand side of the gate piston 100 to hold its gate rod 132 in the advanced or rightmost position, as shown in FIG. 2, so as to be in the proper position to present a fastener to the gate assembly 20.

When the operator desires to start a cycle, he closes the foot switch 84 which triggers the low pressure timer A and starts its timing sequence.

Virtually immediately the advance-retract solenoid 59 becomes energized, actuating the four-way valve 60, whereby low pressure air flows from the regulator 54 through the pipe 101, the T-connector 103, and pipe 104, the port 105, to the port 136 through pipe 137 and into the upper port 138 of the advance air and oil tank 61, resulting in the air at the top of the tank 61 forcing oil to flow (at substantially the same pressure as the pressure of the air) out of the lower port 139, into the pipe 140, through ports 141 and 142 of valve 64 into the pipe 143, then through the T-connector 145, the pipe 146, and the port 147 into the hydraulic cylinder 66.

The piston 102 advances, downwardly as viewed in the illustration, under pressure of the oil and carries the punch ram 150 downwardly. Attached to the ram 150, FIG. 1, is the appropriate punch assembly 22 comprising a punch 166 and a pilot 164 which picks up a nut from the gate assembly 20 and places it in a hole of a workpiece during the top installation of nuts or of studs, and upon an anvil during bottom installation of nuts. As the piston 102 advances, oil on the underside of the piston flows out of the lower port 114, through the pipe 113 and the port 112, back into the retract air and oil tank 62, forcing air out of the port 110 thereof through the pipe 109, the T-connector 108, the pipe 107, the port 106, and exhausting through port 152.

Also, when the foot switch 84, FIG. 3, is closed the gate electrical timer B is signaled by the electrical timer A. Assuming that nuts are to be inserted, after an initial time delay period sufficient for the punch pilot to enter the nut, the electrical timer B energizes the solenoid 57 which actuates the four-way gate valve 56, whereby the air on the left hand side of the piston 100 is exhausted through the port 130, the pipe 129, the port 128 and the port 154, and at the same time low pressure air flows into the gate cylinder 58, on the right hand side of the piston 100, through the pipe 101, the T-connector 103, the pipe 124, the port 125, the port 156, and pipe 157, and the port 158, whereby the piston 100 is forced to move to the left, to its retracted position, carrying with it the gate rod 132 and thus pivoting the gate 162 (and its supply of nuts) away from under the punch assembly 22. While the gate 162 is being pivoted from under the punch assembly 22, the latter is continuing to advance, under pressure of the oil above the piston 102, but the punch pilot 164 is long enough so that no engagement takes place between the punch 166 and the nut or the gate, so that the gate 162 retracts away from under the punch assembly 22 and the punch pilot 164 carries the nut to the workpiece.

The gate valve 56 and the solenoid 57 are controlled by the timer B which keeps the gate 162 in its retracted position for a predetermined time period (in the time diagram, FIG. 4, f plus g, the segment g being variable) sufficient for the hydraulic piston 102 to complete its downward stroke and to return to its upper position, the position shown in FIG. 2, i.e., the "ready" position prior to initiation of another cycle. The gate 162 is returned under the punch assembly 22 at such time, because the timer B deenergizes the solenoid 57 which permits the gate valve 56 to return to its initial position under the bias of a spring 170, in which position the low pressure air flows into the cylinder 58, on the left hand side of the piston 100, and the air on the right hand side thereof is exhausted, causing the piston 100 and the gate rod 132 to move back to the position shown in FIG. 2 in which the gate 162 is under the punch assembly 22.

When the nut has been carried by the punch pilot 164 into contact with the workpiece, the pneumatic and hydraulic circuit provides a sufficient force on the piston 102, of short duration, to clinch the nut to the workpiece. The application of the higher force is controlled by timer C which is signaled by timer B. That is, when the gate timer B energizes the solenoid 57, at the end of the initial time delay period, period e in the time diagram, FIG. 4, an initial time delay period starts at timer C, indicated as time period h on the diagram, this time delay period being slightly greater than the time required for the punch assembly 22 to place the shank of the nut in the hole in the workpiece with the nut resting on the workpiece. At such time, i.e., the end of time period h, the timer C energizes solenoids 65 and 72 actuating valves 64 and 70 to provide the higher force on the piston 102.

The two right hand ports 180 and 182 of the valve 64 are permanently closed, so that when the valve 64 actuates, due to energization of the solenoid 65, communication between the hydraulic chamber 184 of the booster cylinder 74 and the advance tank 61, through the pipe 185, the T-connector 145, the pipe 143, and the port 142, is blocked.

At this time the high pressure air flows from the high pressure regulator 52 through the pipe 186, the port 187, the port 188, the pipe 190, and the port 191 into the booster cylinder 74 on the underside of the force amplifying piston 192. The piston 192 has a large, lower surface 193 upon which the high pressure air is applied and an upper piston 194 of much smaller diameter but movable jointly with the piston 192, the piston 194 having a smaller, upper surface 195 for pressurizing the oil within the chamber 184. Thus, the hydraulic pressure in the chamber 184 will be a multiple of the air pressure in the air chamber 196 below the piston 192 and directly proportional to the ratio between the surfaces 193 and 195, resulting in a higher oil pressure in the chamber 184 relative to the air pressure in the chamber 196. The high oil pressure in the chamber 184 causes the oil to flow under high pressure through the port 197, the pipe 185, the T-connector 145, the pipe 146, and the port 147 into the hydraulic cylinder 66 in the chamber above the piston 102, thereby forcing the piston 102 and rod 150 to move downwardly, for the last, short portion of its downward stroke under a high force at which time the fastener is clinched to the workpiece.

The cylinder 201, defining chamber 184, and the piston 194 are so proportioned, relative to the stroke traveled, so that a portion of the piston 194 is always surrounded by the cylinder 201, as shown in FIG. 2.

Thus, with a booster piston 192 having a lower surface of approximately 5 inches in diameter and an upper piston 194 of approximately 1 inch in diameter, and a hydraulic piston 102 of approximately 2 inches in diameter, for every one p.s.i.g. which is applied to the lower surface 193 of the booster piston 192, a force of about 78 pounds results at the hydraulic piston rod 150 and the attached punch assembly 22.

Figure 4:
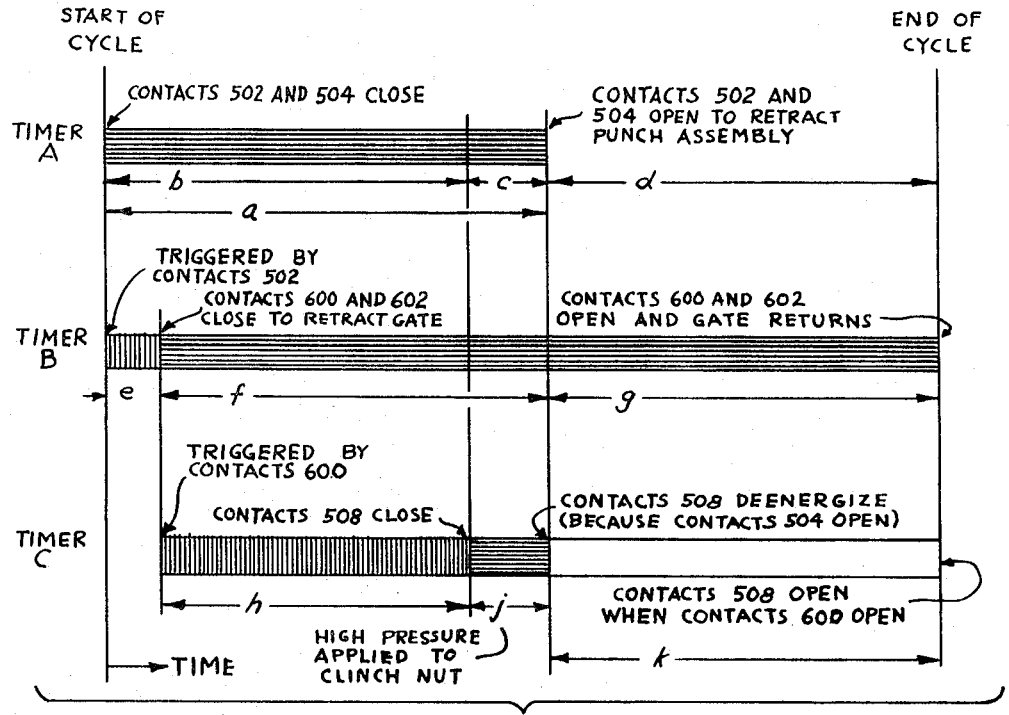
FIG. 4 is a time diagram illustrating the timing function of the electrical timers for securing nuts to the top of a workpiece.

In the diagram, FIG. 4, the short interval of time during which the high force is applied by the punch assembly to the fastener is indicated as j. The time period j is set so as to provide a long enough time to clinch the fastener to the workpiece plus an increment of time to assure that the clinching has taken place at which point timer A deenergizes the solenoids 59, 65 and 72. Deenergization of the solenoids 59, 65, and 72 causes them and the valves 60, 64, and 70, respectively, which they control to return to their initial positions under pressure of the springs 198, 199, and 200, respectively, against which the solenoids act, resulting in the retraction of the pistons 102 and 192 by the low pressure air.

The reversal of the valves 60, 64 and 70 causes the pistons 192 and 102 to retract, and reverses the flow previously described. At this time, air is supplied through the port 106 of the valve 60, through the pipe 107, through the T-connector 108, the pipe 109, and the port 110 into the top of the retract tank 62, causing oil in the retract tank 62 to flow out through the port 112 into the pipe 113, and through the port 114 of the hydraulic cylinder 66 into the lower end of the hydraulic cylinder 66 to force the piston 102 to retract, i.e., raising the piston 102 to the position shown in FIG. 2. The foregoing causes oil to flow from the top of the cylinder 66 through the port 147, the pipe 146, the T-connector 145, the pipe 185, the port 197 into the chamber 184 of the hydraulic booster cylinder 74, and through the T-connector 145, the pipe 143, the port 142 (of the valve 64) the port 141, pipe 140, and the port 139 into the lower end of the advance tank 61, causing air to flow from the top of the advance tank 61 out through the port 138, the pipe 137, the port 136 to be exhausted through the port 152 of the valve 60.

In the meanwhile, low pressure air flows through the valve 60 and its port 106, the pipe 107, the T-connector 108, the pipe 111, the port 122 of the hydraulic booster 74 and into the upper air chamber 121 thereof against the upper face 204 of the piston 192 forcing air (in the lower chamber 196 of the booster 74) to be exhausted through the port 191, the pipe 190, the port 188, and the port 205 of the valve 70.

TIME SEQUENCE DIAGRAM

Nut installation to upper surface of workpiece

Referring to FIG. 4, the left hand most vertical line represents the starting time of the cycle, at the time the foot switch 84 is closed, and the right hand most vertical line the end of the cycle.

Timer A

The contacts 502 and 504 close with the closing of the foot switch 84 and the time period a commences, a variable time period during which low pressure air may flow from the valve 60 to the tank 61. The time period a is broken into two segments, b representing the time required to place the nut upon the workpiece and c the time required to clinch the nut to the workpiece (plus time for assurance). At the end of the time period a the contacts 502 and 504 of timer A open, reversing the valve 60 whereby the ram 150 retracts, the retraction time being designated as period d, at the end of which the press is again in its "ready" position. The period a is preset for the minimum advance stroke of the press by the resistance 506 and increased for longer strokes by the resistance RA.

Timer B

When the contacts 502 of timer A close they trigger timer B and the initial time delay period e takes place (permitting the punch pilot to enter the nut) at the end of which contacts 600 and 602 of timer B close and the gate 162 retracts. The time period f, is the time period from the time the gate retracts to the time the punch starts to retract and is determined by the period e which is preset by adjusting the resistance 606 to provide the time required for the punch pilot to grasp a nut. Thereafter, resistance 607 and RB provide the variable time delay period g before which the contacts 600 and 602 will open and return the gate so as to permit the punch assembly to fully retract before the gate returns.

Timer C

The timer C is triggered by the closing of the contacts 600 of timer B which starts the variable time delay period h before which the high force is applied to the punch. The period h is preset by resistance 700 for the minimum downward stroke of the punch. At the end of the time delay period h the contacts 508 of timer C close and high pressure air is applied to the booster cylinder 74 resulting in the high clinching force at the ram 150. The high pressure air is supplied until the contacts 508 become deenergized which happens with the opening of contacts 504 at the end of period a, i.e., the period j ends simultaneously with the period a.

When contacts 600 of timer B open, they cause contacts 508 to open also, at the end of nonfunctional time k of timer C.

WIRING DIAGRAM

Referring to the diagrammatic wiring diagram, FIG. 3, the electrical circuit is connected to a suitable source of electrical current, preferably 110 volt, 60 cycle alternating current by the main switch 82. Power lines 300 and 302 extend from the switch 82, as shown, and connected to the power lines 300 and 302 is a vibratory feeder hopper 303, a rheostat and half-wave rectifier 305 and a switch 307 to control them, as shown, by wire 304. A signal red light 311 may also be connected, by the wire 306 to the power lines, to indicate that the switch 82 is closed.

The internal circuitry of the three timers, the low pressure timer A, the gate timer B, and the high pressure timer C is supplied with electrical power by the wires 308, 309 and 310 which are connected to the terminals TA, TB and TC of timers A, B and C, respectively, and by the wires 312, 314 and 313 to the terminals TD, TE and TF, respectively, of each timer.

The low pressure solenoid 59 is controlled through terminals T3 and T4 of the timer A, terminal T3 being connected to power line 300 by wire 316 and terminal T4 being connected by wire 317, through ram safety switch 320, to the low pressure solenoid 59. The low pressure solenoid 59 is in turn connected by a wire 321 to the power line 302 to complete the circuit. Note that when the ram safety switch 320 is removed, during insertion of studs instead of nuts, a switch 319A is provided to shunt the opening in the circuit formed by the removal of the ram safety switch 320.

Terminals T1 and T2 of timer A, are connected by wires 322 and 323 to contacts TG and TH, respectively, of timer B to trigger the latter when the circuit is closed between terminals T1 and T2.

Likewise, the terminals T5 and T6 of timer B are connected by wires 325 and 326 to the terminals TJ and TK of the timer C to trigger the latter when the circuit between terminals TJ and TK closes, at relay contacts 600.

Referring to the timer B, the terminal T7 is connected by wire 330 and wires 331 and 332 to gate relay RY1 and high pressure relay RY2, power being supplied to terminal T8 by wire 338. In the position illustrated, the circuit to the gate solenoid 57 is completed through the center contact 339 of RY1, by the wire 334, the closed switch 335 and the wire 340. The other side of the solenoid 57 is connected to the power line 302 by the wire 342. If desired, an amber light 343 may be connected in parallel across the solenoid 57, as shown, indicating that a cycle is in process.

The solenoid 72 for the high pressure valve and the solenoid 65 for blocking the oil flow at certain times are energized when the circuit closes between T9 and T10 of timer C. Terminal T9 is connected to the wire 317, as shown, by the wire 350, and the contact T10 is connected by the wire 352 to the left contact 354 of RY2, whose contacts 354 and 356 are normally closed, the right hand contact 356 being connected to the high pressure solenoid 72 by the wire 358, the solenoid 72 being connected to the power line 302 by the wire 360.

The hydraulic solenoid 65 is connected in parallel across solenoid 72 by the wires 362 and 364, as shown.

Also, if desired, a counter 366 may be connected in parallel across the solenoid 72, as shown.

To vary the timing characteristic of the timers A, B and C, each timer has an initial variable resistance. However, to provide further timing variation, variable resistors RA, RB and RC are added, these resistors being illustrated in the diagram connected by a dotted line to indicate that they are jointly movable.

Resistor RA is connected between terminals TL and TM of timer A by wire 390 through the switch 392. The variable resistor RB is connected between terminals TN and TP of timer B by a wire 394, as shown. The resistor RC is connected between the terminals TR and TS of timer C by wire 396 through switch 319B which in the position shown bypasses the fixed resistor 398.

To initiate a cycle, the foot switch 84 is connected by wires 400 and 401 to terminals TX and TZ, respectively, as shown.

Studs

The circuit shown in FIG. 3 includes a double throw switch having three poles 319A, 319B, and 319C provided for use in securing studs (to the top surface of a workpiece); although in the wiring diagram the three poles 319A, 319B and 319C are shown physically separated one from the other as a matter of convenience.

To adjust the press for stud installation, the poles 319A, 319B and 319C are jointly moved to the alternate positions shown in the diagram. Also, at such time the gate safety switch 320 is removed and the closing of switch pole 319A provides the electrical connection to complete the circuit to the low pressure solenoid 59. Pole 319C is connected by wire 397 between terminals TT and TV of timer B and closing of the pole 319C closes the circuit between the terminals TT and TV of the timer B which eliminates the initial time delay of the timer B. The moving of the switch 319B to its alternate position places a fixed resistance 398 in series with the resistance RC which increases the time delay of the timer C to compensate for the elimination of the initial time delay at the timer B which takes place due to the closing of switch 319C.

In the foregoing manner all three poles 319A, 319B and 319C have been jointly moved to their alternate position, and the circuit is now adapted for the insertion of studs.

FUNCTION OF TIMERS

Timer A

Figure 5:
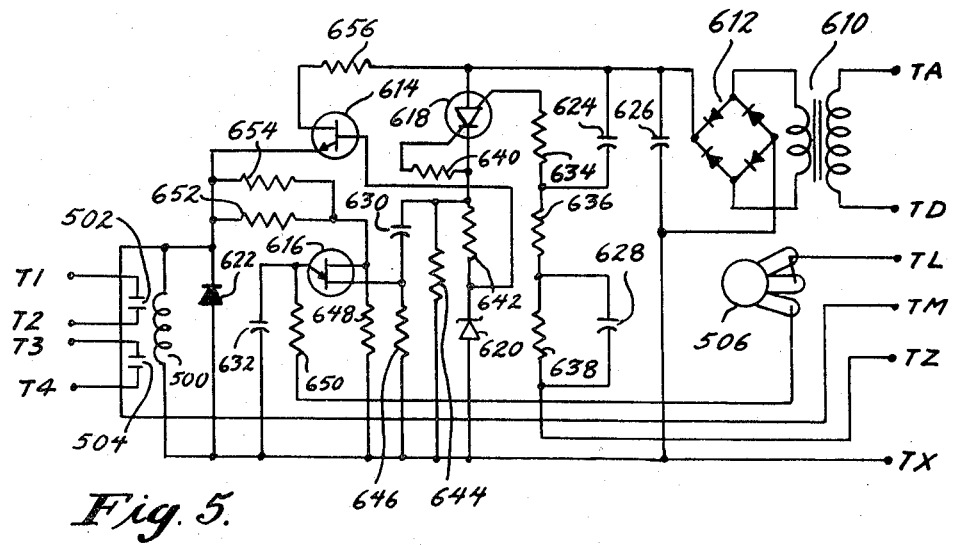

Referring to FIGS. 3, 4 and 5, the timer A controls the low air pressure portion of the pneumatic/hydraulic circuit, FIG. 2, and when triggered, by momentary or maintained closing of the circuit between the terminals TX and TZ upon the closing of the foot switch 84, will energize its relay coil 500, FIG. 5, sufficiently to close the relay contacts 502 and 504 between terminals T1, T2 and T3, T4, respectively, virtually immediately, and maintain these relay contacts closed for a predetermined length of time, period $a$ in FIG. 4, at the end of which they will open. This predetermined time period $a$ is set with a variable resistor 506 and is supplemented by another variable resistor RA shown connected externally across the terminals TL and TM. Zero resistance (of both resistances 506 and RA) will produce zero time "on," i.e., zero resistances prevents these relay contacts from closing, and infinite resistance (or an open circuit, as when the switch 392 is opened) will produce an infinite time "on," i.e., it prevents these contacts from opening once closed. However, the variable resistance 506 is preset (when the machine is constructed) so as to always provide at least that resistance which is required for the minimum stroke of the punch assembly 22.

Thus, when relay contacts 504 are closed, the low pressure solenoid 59 is energized and air is being supplied to the tank 61 causing oil to flow to cylinder 66, whereby the piston 102 advances from the position shown in FIG. 2.

More specifically, in FIG. 4, the time period $b$ represents the time period from which the foot switch 84 is closed to the time the nut is placed (by the punch pilot 164) with its shank in the hole of the workpiece. The time period $c$ represents the time period required for the high pressure force to clinch the nut, plus an additional small time for assurance that the clinching has in fact taken place, and is equal to the time period $j$ of the timer C. At the end of the time period $a$, the relay contacts 502 and 504 of the timer A open, the opening of the relay contacts 504 resulting in the deenergization of the relay contacts 508 of the timer C.

Timer B

The timer B provides a combination of a time delay before the closing of its contacts 600 and 602 and a time period during which the contacts 600 and 602 thereof remain closed. The timer B is triggered by the closing of the circuit between the terminals TH and TG thereof through relay contacts 502 of the timer A at which time the gate timer B will start a predetermined time delay period, period $e$ in FIG. 4, after which its contacts 600 and 602 will close. When the contacts T7 and T8 close, the gate 162, FIG. 1, is retracted from under the punch 166 and does not return until they open. Contacts 600 and 602 will remain closed as long as contacts 502 of timer A are closed and will also remain closed subsequent to the opening of the contacts 502 for a predetermined time period, time period $g$, measured from the time at which the circuit between TH and TG is opened by the opening of the contacts 502 of the timer A, the time period $g$ being made sufficient to permit the punch to fully retract before the gate is returned under the punch.

The predetermined time relay period before the closing of the contacts 600 and 602, period $e$ in FIG. 4, is set with a variable resistor 606 connected between the terminals TT and TV of the timer B. The predetermined time delay period $g$ during which the contacts 600 and 602 remain closed is set with the variable resistor 607 and is supplemented by the variable resistor RB shown connected across the terminals TN and TP. As the value of the resistors RB and/or 607 increase, this time delay period will also increase. However, the variable resistance 607 is preset (when the machine is constructed) so as to always provide at least that time which is required to return the punch assembly 22 corresponding to the minimum stroke thereof.

To adapt the circuit for the insertion of studs, the resistance 606 is effectively eliminated by moving the switch pole 319C to its alternate position, thereby shorting terminals TT and TV which results in the contacts 600 and 602 closing immediately, i.e., the initial time delay period becomes substantially zero.

Timer C

The timer C which controls the high pressure air flow provides an initial time delay period before its contacts 508 will close, period $h$ in FIG. 4. When triggered by the closing of the circuit between terminals TJ and TK upon the closing of the contacts 600 of timer B, timer C will start a predetermined time delay period, the period $h$, before the relay contacts 508 close. Once closed, contacts 508 will remain closed until the circuit between the terminals TJ and TK is opened when the relay contacts 600 open. The deenergization of the contacts 508 of the timer C is determined by the timer A because the contacts 508 receive their power from the contacts 504 of the timer A. Since the contacts 504 of the timer A open before the circuit between terminals TJ and TK of timer C is opened by the contacts 600 of the timer B, they first lose their power and then subsequently open. The predetermined initial time delay period $h$ of the timer C is set with a variable resistor 700 and is supplemented by the variable resistor RC, the latter being shown connected externally across the terminals TR and TS. Zero resistance (from both resistors 700 and RC) will produce substantially no initial time delay period and infinite resistance (or an open circuit) will result in the contacts remaining closed. However, the variable resistance 700 is preset (when the machine is constructed) so as to always provided at least that resistance which is required for the minimum stroke of the punch assembly 22.

To adapt the circuit for the insertion of studs, the fixed resistor 398 shown across TR and TS is added in by the switch pole 319B.

SUMMARY OF TIMER OPERATION

Referring to the timer B, when the foot switch 84 is closed, the timer B is triggered due to the closing of the contacts 502 of the low pressure timer A. At the end of the time delay period $e$, the contacts 600 and 602 of the timer B are closed. Once closed the contacts 600 and 602 of timer B remain closed for a fixed time period $f$ (which terminates with the opening of contacts 502 and 504 of timer A) and an adjustable time delay period $g$ starting when the contacts 502 of the timer A open. The initial time delay period $e$ of timer B is made sufficiently long to permit the punch pilot to enter the nut at which time the solenoid 57 is energized to swing the gate 162 away from under the punch 166 before the punch attempts to pass the gate, otherwise the punch would impinge on the gate and likely cause damage to the gate and/or the punch. The variable time period a and the variable time period g together are sufficient for the punch to complete its downward stroke, to clinch the nut to the workpiece, to provide an additional small time increment to assure that complete clinching has taken place, and to provide the time required to retract or return the punch to its "ready" position, i.e., the position of the ram 150 shown in FIG. 2. It is readily apparent that the time periods a and g will vary with the length of the punch stroke.

The initial time delay period h of the timer C, the time period before closing of the contacts 508 of the timer C, is the time between the swinging away of the gate 162 from under the punch 166 to the time that the shank of the nut enters the hole in the workpiece. The contacts 508 of the timer C close when the shank enters the hole in the workpiece and the fastener engages the workpiece at which time the high pressure solenoid 72 is energized to actuate the high pressure valve 70, and the contacts 508 remain closed for a time period sufficient to provide the high pressure force at the punch 166 which is required to clinch the nut, plus an additional time increment for assurance that the clinching has taken place, and thereafter the contacts 508 of timer C become deenergized, due to deenergization of the contacts 504 of the timer A. However, the contacts 508 of timer C do not open until the contacts 600 of timer B open, because the timer C is triggered by the contacts 600 of timer B.

CIRCUITRY OF THE TIMERS

Figure 6:
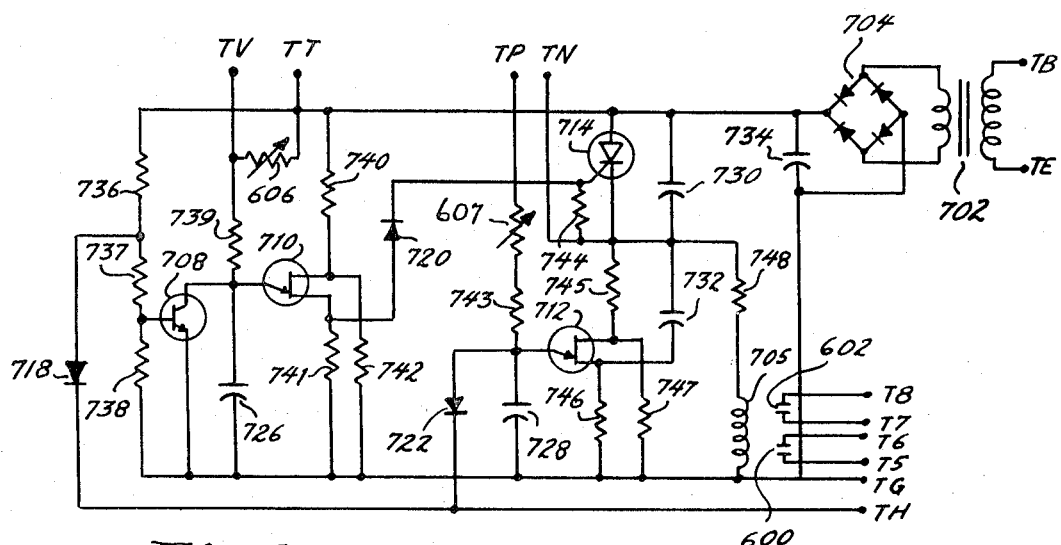

FIGS. 5, 6 and 7 are diagrammatic views of the internal circuits of the timers A, B and C. While these circuits per se are not herein claimed they are shown, and briefly described, to illustrate timers that may be used to provide the timing functions required.

TIMER A INTERNAL CIRCUIT

Timer A internal circuit

As illustrated in FIG. 5, power is supplied to transformer 610 through terminals TA and TD, the transformer 610 being connected to a rectifying bridge 612. As previously described, the foot switch 84 is connected between terminals TZ and TX and the timer A is triggered by the closing of the foot switch 84, either momentarily or continuously, to initiate a cycle by causing the relay coil 500 to become energized sufficiently to close the relay contacts 502 and 504 and to maintain them closed for the previously discussed time period a, FIG. 4, during which time the punch assembly 22 advances and thereafter retracts to its initial position. To accomplish the foregoing, the circuit of timer A comprises transistors 614, 616, and 618, Zener diode 620, diode 622, capacitors 624, 626, 628, 630 and 632, and resistors 634, 636, 638, 640, 642, 644, 646, 648, 650, 652, 654, and 656 connected as shown in FIG. 5.

Timer B internal circuit

As illustrated in FIG. 6, power is supplied to the transformer 702 through terminals TB and TE, the transformer 702 being connected to a rectifying bridge 704. As previously described, when the timer B is triggered by the closing of relay contacts 502 of timer A, the initial predetermined time delay period of timer B starts, period e, FIG. 4, and at the end of the time delay period e the relay coil 705 is energized sufficiently to close the relay contacts 600 and 602 of the timer B to retract the gate 162, the contacts 600 and 602 opening after the end of a variable time period g at which time the gate 162 returns to its initial position. To accomplish the foregoing, the circuit of timer B comprises transistors 708, 710, 712, and 714, diodes 718, 720, 722, and 724, capacitors 726, 728, 730, 732, and 734, resistors 736, 737, 738, 739, 740, 741, 742, 743, 744, 745, 746, 747, and 748, and variable resistors 606 and 607 connected as shown in FIG. 6.

Timer C internal circuit

As illustrated in FIG. 7, power is supplied to the transformer 800 through terminals TC and TF, the transformer 800 being connected to a rectifying bridge 802. As previously described, upon the closing of relay contacts 600 of timer B, the timer C is triggered and the variable, initial time delay period, period h, starts and at the end of the time period h the relay coil 804 is energized sufficiently to close the relay contacts 508, whereby high pressure air is admitted to the booster cylinder 74 to apply a high force at the ram 150, and at the end of the time period j the relay contacts 508 become deenergized, since the relay contacts 504 of timer A open at such time. The relay contacts 508, although deenergized, remain closed during the time period k, FIG. 4, until the relay contacts 600 of timer B open at which time the relay coil 804 of timer C becomes sufficiently deenergized to permit the relay contacts 508 to open. To accomplish the foregoing, the circuit of timer C comprises transistors 810 and 812, diodes 814, and 816, capacitors 818, 820, and 822, resistors 826, 827, 829, 830, 831, 832, 833, 834, and 835, and the variable resistor 700 connected as shown in FIG. 7.

MANUAL FASTENER PLACEMENT

When it is desired to operate the press without the automatic feeding of fasteners (nuts or studs), the rod 132 can be locked in the retracted position by moving the switch 335 to the alternate position shown in the wiring diagram, FIG. 3, to close the circuit to the solenoid 57 extraneous of the timer B, by bypassing the timer B. The position of switch 335 can be changed at any time in the cycle without harming the press, but usually will be changed before the cycle has started and when the switch 335 is moved to its alternate position it pulls the gate out from under the punch assembly or keeps it pulled back if it has already retracted. That is, when the switch 335 is in its alternate position it is in parallel with the relay contacts 602 of timer B, whereby the solenoid 57 energizes and actuates the valve 56 to hold the rod 132 in the retracted position until the switch 335 is returned to the position shown in FIG. 3. This feature is useful when it is desired to change only the punch assembly 22 and anvil 24 to install a few nuts, by hand placing them on the punch pilot 164, or a few studs by hand placing them in the appropriate punch assembly.

GATE SAFETY SWITCH

Referring to FIG. 8, the gate safety switch 320 is carried by the gate 162. The gate safety switch 320 is mounted on a plate 850 which is secured to one side of the gate 162. The switch 320 includes an actuator button 855, shown in FIGS. 11 and 14, which is held in its depressed position by a leaf 851 biased upwardly by a coil spring (not shown), but which is wrapped about the screw 852 which extends down below the leaf 851, the coil spring being carried by the gate 162 and the leaf 851 being anchored at its right hand end to top of the cross bar 854. The switch 320 is connected to the electrical circuit, as shown in FIG. 3, by wires 855.

The switch 320, when not actuated, has its contacts open. However, the leaf 851 is biased upwardly by the coil spring wrapped about the screw 852 and normally maintains the switch actuator depressed, i.e., in its contacts closed position as shown in FIG. 3.

The purpose of the gate safety switch 320 is to prevent the punch and hydraulic piston rod 150 from damaging the gate 162, if the gate 162 does not pull away from punch assembly 22 in time. For example, if the nut jams in the gate while the pilot 164 is in the nut, or the operator has not connected the air pipes to the cylinder 58, the gate 162 may not pull back when it is supposed to. If the gate 162 does not pull back from under the advancing punch, it may be damaged by the punch 166, especially if the high pressure regulator is at a high value.

If the gate 162 does not pull back, the safety switch 320 is arranged so that the advancing punch 166 will engage the leaf spring 851, at its forward portion 858, the leaf spring 851 will then move downwardly, releasing the switch actuator (not shown), thus opening the electrical circuit to the solenoid 59, whereupon the latter deenergizes and the valve 60 reverses, causing the piston 102 and ram 150 to retract and move away from the gate 162.

As soon as the punch 166 retracts from the leaf end 858, the circuit will reclose, since the leaf 851 will again depress actuator of the switch 320. When the circuit recloses, solenoid 59 will again be energized and valve 60 will actuate, causing ram 150 and the punch 166 to advance. If the malfunction is still in effect, the leaf 851 will be actuated again by the punch 166 and the above process will be repeated. The punch 166 and the hydraulic piston rod 150 conceivably might cycle up and down against the leaf 851 until the time interval set on timer A has elapsed at which time the piston rod 150 and punch 166 would return, and remain, in "ready position," as they would normally do at the end of a normal cycle.

GATE ASSEMBLY AND NUT INSTALLATION TO TOP SURFACE OF WORKPIECE

Referring to FIG. 8, the gate assembly 20 comprises a support plate 860 which carries the gate 162, a stop block 861, a fulcrum providing arm 862, and the cylinder 58. The gate 162 is pivoted by the rod 132 about a vertical axis defined by a pin 863, pressed into the gate 162 and extending slidably into a hole 864 in the plate 860, and a spring loaded ball device 865, the ball of which is received in a seat 866 (vertically aligned with the pin 863), the spring loaded ball device 865 being carried by the arm 862 and the arm 862 being secured to a block 867 which is in turn secured to the plate 860.

The stop block 861 carries two stop screws 868 and 869 the ends of which limit the retracted and extend positions of the gate 162 by engagement alternately with the cross arm 854 or the gate 162.

The gate 162 has a groove 870, which when the gate is extended, is aligned with the groove 871 in the track 19 to receive a supply of fasteners. When in operation, the groove 870 is full of nuts and, of course, when it retracts, it retracts with the nuts remaining in the groove 870, except for the nut into which the punch pilot 164 has entered which at this time leaves the gate 162.

The forward portion of the gate 162 includes a finger 872, carried in a slot 839, and pivotal about a pin 841, the finger 872, being biased clockwise, FIG. 23, so as to restrain the nut, by a spring 842 and limited in clockwise motion by a clip 843 secured to the corner of the gate, as shown in FIGS. 21 and 23.

The groove 870 is covered by a lid 859 having a suitable notch 859a to permit the punch pilot to reach into a nut, the gate 162 having an aligned notch 859b, (FIG. 10) into which the forward part of the pilot 164 extends.

Assuming the circuit to be in the position shown in FIG. 3, the track and gate to be full with nuts, and that the foot switch 84 has been depressed, the punch pilot 164 will move downwardly into a nut carried by the gate, FIGS. 11 and 14, the nut being prevented from escaping from the forward end of the groove 870 by the spring biased finger 872. When the gate 162 retracts, the finger 872 pivots out of engagement with the nut and the nut is carried toward the anvil 24, as shown in FIGS. 12, 13, 15, and 16, the nut being held on the punch pilot 164 by the spring 873.

The operator has previously placed the workpiece 874 so that the nose 875 of the anvil pilot 878 extends through the hole in the workpiece 874 which is to receive the nut and the nut is carried downwardly until its shank is within the hole in the workpiece, the punch pilot 164 first engaging the anvil nose 875 and causing the punch pilot 164 to retract against the bias of its spring 880, because the punch pilot 164 is biased downwardly by the spring 880 which is weaker than the spring 876 which biases the anvil pilot 878 upwardly. When the punch pilot 164 engages the nose 875, the punch pilot 164 retracts (upwardly) until the face 882 of the punch 166 engages the top of the nut at which time the punch 166 moves the nut downwardly, the nut now depressing the nose 875 downwardly, i.e., the shank of the nut now replacing the nose 875 in the hole in the workpiece. At approximately the time the nut engages the top surface of the workpiece, the timing of the cycle is such that high pressure air flows into the booster cylinder 74, under the piston 192, to provide the high force at the ram 150 and the punch 166 which is required to clinch the nut to the workpiece.

The punch assembly has a central hole 879 housing the spring 880 and the upper end of the punch pilot has a collar 884 of larger diameter than the main portion of the punch pilot 164 providing a lower seat for the spring 880 (and also preventing the escape of the punch pilot 164 from the punch through the smaller diameter hole 879a), the collar 884 and the pilot 164 being slidably received in the holes 879 and 879a. Above the spring 880, a threaded set screw 886 provides an upper seat for the spring 880 and closes the holes 879. The entire punch pilot assembly is received in a central hole 881 in the punch ram 150 and is secured thereto by suitable set screws 887, as shown in FIG. 13.

The anvil has a central hole 888 housing the spring 876 and the lower part of the anvil pilot 878 has a collar 889 of larger diameter than the main portion of the anvil pilot 878 providing an upper seat for the spring 876, the collar 889 being slidably received in the hole 888. The collar 889 is retricted from escaping upwardly from the anvil 24 by the seat formed at the juncture of the smaller diameter hole through which the anvil nose slidably protrudes and the larger diameter hole 888. Below the spring 876 a threaded plug 890 provides a lower seat for the spring 876 and the lower portion of the plug 890 extends through a hole in the anvil holder 26 and is secured thereto by a nut 891, as shown in FIG. 10.

Preferably the anvil pilot 878 has a conical shaped central hole which receives and seats the leading portion of the punch pilot 164 which has a mating conical shape. This mating arrangement is provided because the punch pilot 164 may have a certain amount of looseness relative to the punch 166, depending on manufacturing tolerances, and the mating seating arrangement described tends to assure that when the punch pilot engages the anvil pilot they will remain in vertical alignment.

As shown in FIG. 31, the spring 873 carried by the punch pilot 164 extends through a hole in the nose of the punch pilot 164 and the latter has vertical grooves 892 on opposite sides into which portions of the spring collapse, the single piece spring 873 having end portions extending into the parts of the grooves surrounded by the forward portion of the punch 166 when the punch pilot is fully extended, as shown in FIG. 10, and the spring 873 having spring bowed portions which are bowed to a diameter greater than the diameter of the crests of the threads of the nut which is to be carried by the punch pilot from the gate to the workpiece. The outside diameter of the forward portion of the punch pilot 164 is, of course, somewhat less than the diameter across the crests of the threads in the nut, and the grooves in the punch pilot are made sufficiently deep so that the spring 873 may collapse sufficiently to facilitate the transfer of the nut to the workpiece.

NUT INSTALLATION TO UNDER SURFACE OF WORKPIECE

The wiring diagram is shown in FIG. 3 for the condition in which the nuts are to be secured to the top surface of the workpiece. To adapt the unit to feed nuts so that they may be secured to the undersurface of the workpiece, the switch 370 is closed, connecting the coils of relays RY1 and RY2 through the wire 372 to the power line 302. The wires 374 and 376 are connected to the wire 352, through the coil of relay RY1, and when the contacts 508 and 504 are closed (of timer C and timer A, respectively) the circuit to the other power line 300 will be completed, energizing the coil of relay RY1. As to the coil of relay RY2, the wire 380 connects it to the switch 370 and the wire 332 to the terminal T7 of the timer B so that when the contacts 602 (of timer B) close, it is also connected to the power line 300 through wire 338, as shown.

To prepare the press for installation of a nut to the under surface of a workpiece, the anvil illustrated in FIG. 17 is substituted for the anvil illustrated in FIG. 13. As shown in FIG. 17, the anvil 894 has an integral nose 895 and a lower threaded bore 896 to receive a threaded insert for securing the anvil 894 to the anvil holder.

Assuming the switch 370 to be closed and the nuts to be now supplied by the track to the gate with their shank up, the operator closes the foot switch 84 to initiate the first stroke of the punch assembly 22 in which the punch pilot 164 picks up a nut from the gate 162 and transfers it to the anvil nose 895, the gate 162 retracting as previously described. The transfer takes place because when the punch pilot 164 engages the rigid nose 895, the spring 880 compresses, as the rod 150 continues to move down, causing the punch pilot 164 to retract relative to the punch 166 until the punch face 882 engages the top of the nut, nudging it down beyond the part of the spring 873 which is holding it, whereupon the nut drops onto the anvil's upper surface with the nose 895 now extending into, but not beyond the shank of the nut.

The punch assembly 22 then retracts, due to the retraction of the ram 150, and the operator now places the workpiece over the nut with the shank of the latter extending into a suitable hole in the workpiece. At this time, the gate 162 remains in its retracted position. Thereafter, the operator again closes the foot switch 84 at which time the second stroke of the punch assembly 22 takes place the punch pilot 164 now engaging the nose 895 and thereafter the punch face 882 bears upon the workpiece to clinch the nut to the workpiece.

Figure 18:
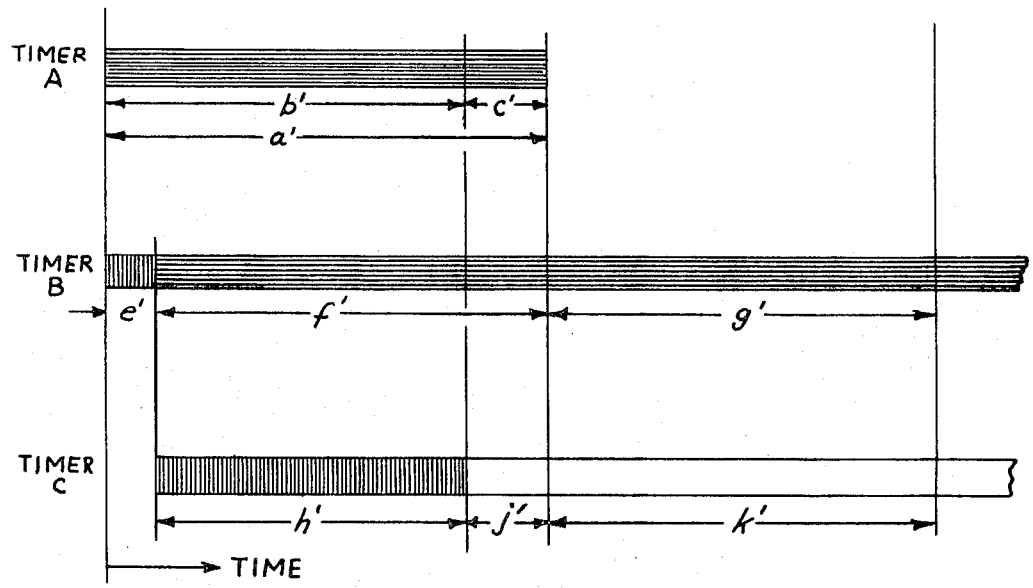
FIGS. 18 and 19 are time diagrams illustrating the two strokes of the punch required for nut installation to the under surface of the workpiece.
Figure 19:
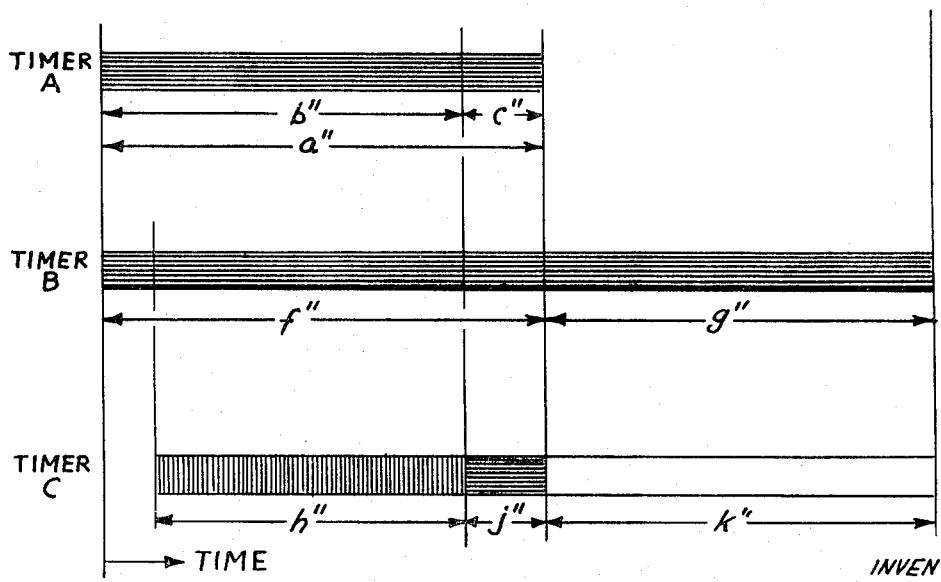

FIGS. 18 and 19 illustrate the time diagrams for the two strokes of the punch required to accomplish installation of a nut to the under surface of the workpiece.

Referring to FIG. 18, it is seen that upon the first closing of the foot switch 84 the relay contacts 502 and 504 of timer A close and the punch assembly 22 starts its advance under low force, until the nut is transferred to the anvil at which time the punch assembly 22 starts to retract, at the end of time period $a'$.

At the end of the time period $e'$, under the control of the timer B, the gate retracts, due to the closing of the contacts 600 and 602 at this time. Also, at this time the relay coil of latching relay RY2 is energized which opens contacts 354 and 356, preventing energization of the high pressure solenoid 72 and the blocking solenoid 65, so that eventually after the time delay period $h'$, when the contacts 508 of the timer TC close it is not possible to energize solenoids 65 and 72.

Further, the coil of latching relay RY1 is also energized, swinging the central contact to the left, FIG. 3, at the end of time period $b'$, at about the time the punch pilot engages the anvil nose, to complete the circuit to the gate solenoid 57 through contact 339A, wire 334, switch 335, wire 340 due to the closing of contacts 508 of timer C to maintain the gate retracted until the relay RY1 is again energized in the next cycle.

Since the relays RY1 and RY2 are sequencing or latching relays, the contacts 339 and 354 remain in the positions to which they have moved at the end of the timing sequence of timers A, B and C.

At the end of the first stroke, the nut has been placed on the anvil 894 and the punch assembly 22 has returned to its initial position. Thereafter, the operator places the workpiece over the nut so that the shank of the nut extends into the hole in the nut and then again closes the foot switch 84 to initiate the second cycle or stroke, FIG. 19.

At the start of the second stroke the contacts 502 and 504 of timer A close, as previously, and the punch assembly advances, time period $a''$.

The gate 162 has remained retracted because the contacts 339 and 339A are closed (because the relay RY1 has latched in this position), maintaining a direct connection to the solenoid 57. Upon the closing of the contacts 508 of the timer C, at the end of time period $h''$, the relay coil of RY1 is again energized, returning the contact 339 to the position shown in FIG. 3, permitting timer B to resume control of the gate.

Also, the relay coil of RY2 energizes upon the closing of contacts 602 of timer B, returning the contact 354 to the position shown in FIG. 3 and energizing the solenoids 65 and 72 at the end of the time period $h''$ and when the contacts 508 of the timer C close, the solenoids 65 and 72 remain energized for the period $j''$. At the end of time period $j''$ the contacts 508 become deenergized due to the opening of the contacts 504 of timer A and at the end of the time period $k''$ the contacts 508 open upon the opening of contacts 600 of timer B.

STUD INSTALLATION

Referring to FIGS. 24 to 32, inclusive, the press may be adapted to the clinching of studs to the top surface of a workpiece.

The punch assembly 22 is removed and the stud punch assembly 900 is substituted, the gate assembly 20 is removed and the stud pusher assembly 902 is substituted, and an appropriate track 904 (and feed hopper assembly, not illustrated) is substituted for the track 19 and feed hopper assembly 16 previously mentioned.

The punch assembly 900 comprises an open ended truncated cone-like case 906 through which centrally and slidably extends the stud punch 907. The stud punch 907 carries a transverse pin 908 the opposite end portions of which are received in opposed slots 909 in the cone-like case 906. The upper ends of two springs 910 are carried, one on opposite ends of the pin 908, and secured at the bottom to screws 911 threaded into the cone-like case 906 to bias the stud case upwardly, as viewed in FIGS. 25 and 26. Between the slots 909 and opposed to each other are placed two leaf springs 914 the upper ends of which are secured by two screws 915 to the case 906. The lower ends 916 of the leaf springs 914 are bent, as shown in FIGS. 25, 26 and 30, and the head of a stud rests upon them, as shown in FIG. 30, the stud being grasped by the ends 916 which must be sprung apart slightly to permit entry of the stud between them, the leaf ends having central notches 917 to accommodate the stud shank.

The stud is placed into the stud punch assembly 900 by the stud pusher assembly 902 which comprises a pusher 920 connected by a clevis 921 and a pin 922 to a rod 922, the rod 922 corresponding to the rod 132 of the previously described nut installation embodiments. The rod 922 is actuated by a piston (not shown) within a cylinder 923 which corresponds to the cylinder 58 of the previous embodiments. The pusher 920 is moved back and forth by the rod 922 and guided between a block 924, the block 924 and cylinder 923 being carried by a plate 925, and the blocks 926 and 927, the forward part of the track 904 being received between the blocks 926 and 927, as shown in FIGS. 25 and 31.

The block 924 includes a groove 929 which receives a finger 930 pivoted about a pin 931 (carried by the block 924), the finger 930 being biased clockwise by a spring 932, FIG. 31, so that the forward end (left end in FIG. 31) normally restrains the escape of the leading stud, as shown. The spring 932 is also received in a groove formed in the block 924 and restrained at its lower end, FIG. 31, by a washer 933 secured to the block 924 by a suitable screw 934.

As illustrated in FIG. 32, the forward portion of the pusher 920 has a small flat 928 (vertical, in FIG. 27) surface to engage the shank of a stud just below the head and to push it into the case 906, through the opening 936, between leaf spring ends 916. The pusher 920, of course, has a limited motion, just enough to move the stud until it seats in the notches 917, but should the stud overshoot slightly, the notches tend to bring it back to the central position below the punch 907. Should the stud overshoot a greater distance, its travel will be limited by engagement with a part of the case 906.

The case 906 carries an L-shaped stop 940 secured thereto by suitable screws. The purpose of the stop 940 is to permit the punch ram 150 (to which the stud punch assembly 900 is secured by suitable set screws 941) to retract the stud punch 907 relative to the case 906, extending the springs 910 which otherwise bias the forward end of the stud punch 907 against the leaf spring ends 916, so as to provide a space between the punch face 942 and the leaf spring ends 916 into which the head of the stud may be placed, as shown in FIG. 27.

FIGS. 27, 28 and 29 show the sequence for installing a stud in a workpiece. In FIG. 27 the pusher 920 is shown just after it has placed a stud between the leaf spring ends 916 of the leaf springs 914, the latter and the lower part of the case 906 being cut away for purposes of illustration, and the punch face 942 being spaced from the stud head by the engagement of the upper end of the L-shaped stop 940 with the portion 943 of the press through which the ram 150 extends.

In FIG. 28, the ram 150 has moved forward and the L-shaped stop 940 has also moved away from the press portion 943 since it is carried by the case 906. When this takes place, the springs 910 move the case 906 upwardly, relative to the punch 907, at which time the head of the stud engages the punch face 942, tending to straighten the stud between the leaf spring ends 916 should it not be vertical. The force of the springs 910 holds the punch 907 in contact with the stud head but is not sufficient to overcome the grasp of the leaf spring ends 916, the stud thus being carried into engagement with the anvil nose 946, FIG. 29.

As shown in FIG. 29, this downward movement of the stud, which has a lower surface which is slightly dished due to the rolling of its threads, seats on the anvil nose 946, the latter being provided with an upper portion shaped to be received within the dished end of the stud to insure proper vertical alignment between the stud and the anvil.

The workpiece, with its prepunched hole, has been placed on the anvil 945 with the anvil nose extending through the workpiece and slightly above the upper surface thereof. When the stud engages the anvil nose 946, the anvil pilot 947 retracts, the spring 948 having a strength such that it will compress at this time while the punch assembly carries the stud downwardly until the forward end of the case 906 contacts, and seats upon, the upper surface of the workpiece. The punch 907 continues its downward movement pushing the stud head past the leaf spring ends 916 and subsequently clinches the head of the stud into the workpiece with the upper surface of the stud head flush with the upper workpiece surface.

After the stud has been clinched to the workpiece the punch assembly returns to the position shown in FIG. 27 at which time the pusher places another stud between the leaf spring ends 916 and the press is now ready to start a new cycle.

As shown in FIG. 31, the pusher 920 is guided between the block 924 and the blocks 926 and 927 and the main portion of the finger 930 is biased against the forward portion of the pusher 920.

The pusher 920 has forward tapered portions 950 and 951, tapered backwardly, as shown in FIG. 32, below the front face 928, the portion 950 being tapered to prevent the pusher from engaging two studs at once.

The case 906 is provided with a front notch 954 at its forward end so that during setting up of the press the operator can visually determine if the stud has been properly clinched. That is, if the high pressure force is not sufficient to properly seat the stud, the operator will be able to see this through the notch 954 and increase the high pressure regulator setting until the stud is properly seated.

In FIG. 25 the finger 930 is partially shown for convenience of illustration.

MISCELLANEOUS

While the various connections described in reference to FIG. 2 have been designated as "pipes" it is seen that flexible hoses or any suitable means could be used. Further, if desired, a filter and an air lubricator may be connected between the air supply 75 and the regulators 52 and 54, as shown in FIG. 2.

TIME SEQUENCE DIAGRAM

Stud installation to upper surface of workpiece

*Timer A.*—Referring to FIG. 24, timer A functions as described in connection with FIG. 4, but to distinguish therefrom the periods have been designated *sa, sb, sc* and *sd* corresponding to periods *a, b, c* and *d* in FIG. 4, respectively.

*Timer B.*—Since the stud pusher 920 has been left in its forward position, FIG. 27, at the end of the previous cycle, by closing switch 319C, and thus closing the circuit between terminals TT and TV shown in FIG. 3, the contacts 600 and 602 close immediately upon the closing of the contacts 502 of timer A, and the pusher 920 is immediately retracted at the beginning of the cycle. The stud pusher remains retracted for the time periods *sf* and *sg* which correspond to the periods *f* and *g* in FIG. 4.

*Timer C.*—Since the closing of contacts 600 for stud installation takes place without any initial time delay period, the resistance 398 is added to the circuit by moving the switch 319B to its alternate position, and this results in the added time delay period *sl* (substantially equal to period *e* in FIG. 4) so that the initial time delay period for stud installation is *sl* plus *sh* at the end of which the high pressure air is applied to the booster cylinder for the period *sj* to clinch the stud, and the period *sk* corresponding to the period *k* in FIG. 4.

SETUP PROCEDURE

With the circuit as shown in FIG. 3, to initially setup the press for the installation of a particular fastener, a nut or a stud, the switch 392 is opened, the high pressure air regulator 52 is turned to zero, and then the press is tripped by closing the foot switch 84. By opening the switch 392, the contacts 502 and 504 close but are kept from opening.

The gate 162 retracts and the high pressure air is applied to the booster cylinder 74, but the cycle does not continue, until the switch 392 is closed.

While the switch 392 is open, the operator may turn the high pressure air regulator 52 so as to permit high pressure air to flow into the booster cylinder 74, until he observes that the fastener has been clinched properly to the workpiece. The regulator 52 is now set for the particular fastener and workpiece combination. The operator will then close the switch 392, permitting the press to complete its cycle.

Having described this invention, what we claim is:

1. An assembling machine for assembling a fastener in a hole in a workpiece comprising a punch assembly and an avil assembly carried by a frame, first hydraulic and pneumatic means for advancing and retracting said punch assembly with a first force to hold and place said fastener in said hole in said workpiece, second hydraulic and pneumatic means for applying a second force, higher than said first force, to said punch assembly, during the end portion of the advance of said punch assembly to clinch said fastener in said hole in said workpiece.

2. The structure recited in claim 1 wherein said first and second hydraulic and pneumatic means include solenoids and electrical timing means connected to said solenoids for sequentially energizing said solenoids.

3. The structure recited in claim 2 wherein said first hydraulic and pneumatic means includes two pneumatic and hydraulic tanks, said second hydraulic and pneumatic means includes a booster cylinder and a hydraulic force cylinder the latter having a first piston actuating said punch assembly, said tanks being supplied alternately with low pressure air to advance or retract said first piston, said booster cylinder having a second piston with a large surface at one end and a small surface at the other end, said cylinder being supplied on the side of the second piston with the large surface with high pressure air but only during the end portion of the advance of said punch assembly to apply a high force thereto.

4. The structure recited in claim 1 wherein a nut feed assembly is provided directly beneath said punch assembly, feed means for maintaining said feed assembly under said punch assembly for predetermined time period, for then retracting said feed assembly, and for returning said feed assembly thereafter.

5. The structure recited in claim 4 wherein said first and second hydraulic and pneumatic means and said feed means include solenoids, and electrical timing means connected to said solenoids for sequentially energizing said solenoids.

6. The structure recited in claim 3 wherein one of the two tanks functions to advance the first piston and its hydraulic portion is connected to both the hydraulic portion of the booster cylinder and of the retract end portion of the hydraulic force cylinder, blocking valve means between the advance tank and the common connection between the hydraulic portion of the booster cylinder and the retract end portion of the hydraulic force cylinder, said blocking valve being open during the low force advance of the first piston and closed when high pressure air is applied to the high pressure air end portion of the booster cylinder.

7. An assembling machine for assembling a fastener in a hole in a workpiece comprising a punch assembly and an anvil assembly, a low pressure air regulator connected to a source of air, a high pressure air regulator connected to said source, an advance and retract low pressure first valve connected to said low pressure air regulator to advance said fastener in said hole in said workpiece or retract said punch assembly after clinching said fastener to said workpiece, first and second tanks containing air and oil, an oil force cylinder housing a first piston to which is connected said punch assembly, a booster air and oil cylinder having a second piston with an end of large diameter movable in an air chamber and an end of small diameter movable in an oil chamber, said large diameter piston end dividing said air chamber into high and low pressure sections, the oil chamber of said booster cylinder being connected to a first end of said oil force cylinder, the opposite or second end of said oil force cylinder being connected to the oil end portion of said second tank, the oil end portion of said first tank being connected to both the oil chamber of said booster cylinder and to the first end of sail oil force cylinder, a high pressure second valve connecting said high pressure air regulator to the high pressure air section of the air chamber of said booster cylinder, said low pressure air section of the air chamber of said booster cylinder being connectable to exhaust, and means for blocking the connection between the first tank, on the one hand, and the booster cylinder and hydraulic force cylinder, on the other hand.

8. The structure recited in claim 7 and further including solenoid means for actuating said valves.

9. The structure recited in claim 8 and further including fastener feeding solenoid means operable sequentially with said solenoid actuating valves.

10. The structure recited in claim 9 and further including electrical timing means for sequentially operating said solenoids.

11. An assembling machine for assembling a nut or the like in a hole in a workpiece comprising a punch assembly and an anvil assembly, air and oil means comprising a first solenoid to operate a valve for controlling low pressure air flow, a second solenoid mechanism for controlling the feeding of said nuts, a third solenoid to operate a further valve for controlling high pressure air flow, a first electrical timer means for energizing said first solenoid, a starting switch for triggering said first timer means, said first timer means controlling said first solenoid, a second electrical timer means triggered by said first timer means, said second timer means controlling said second solenoid mechanism and retracting said mechanism after a time delay period to permit said punch assembly to grasp and place said nut in said hole in said workpiece, a third electrical timer means triggered by said second electrical timer, said third timer means controlling said third solenoid to permit high pressure air to flow so as to apply a high force to said punch assembly near the end of its downward stroke to clinch said nut to said workpiece.

12. The structure recited in claim 11 and adapted for the installation of nuts or the like to the bottom surface of a workpiece comprising two latching relay means, one of said latching relay means being connected to said second timer means so as to retain the mechanism for feeding said nuts retracted until said starting switch is closed at the end of the first cycle, the other of said latching relay means being connected to said third timer so as to prevent high pressure air from flowing during the first cycle and to provide for the flow of high pressure air after the starting switch is closed for the second time.

13. An assembling machine for assembling a stud or the like in a hole in a workpiece comprising a punch assembly and an anvil assembly, air and oil means comprising a first solenoid to operate a valve for controlling low pressure air flow, a second solenoid mechanism for controlling the feeding of said studs, a third solenoid to operate a further valve for controlling high pressure air flow, a first electrical timer means for energizing said first solenoid, a starting switch for triggering said first timer means, said first timer means controlling said first solenoid, a second electrical timer means triggered by said first timer means, said second timer means controlling said second solenoid mechanism and retracting said mechanism immediately upon the closing of said starting switch, a third electrical timer means controlling said third solenoid to permit high pressure air to flow so as to apply a high force to said punch assembly near the end of its downward stroke to clinch said stud in said hole in said workpiece, said solenoid mechanism on de-energization placing another stud within said punch assembly.

14. The structure recited in claim 11 wherein said punch assembly has a punch pilot biased downwardly by a first spring, said anvil assembly having an anvil pilot biased upwardly by a second spring, said first spring being weaker than said second spring.

15. The structure recited in claim 14 wherein said punch and pilot anvils have mating surfaces.

16. The structure recited in claim 15 wherein said punch pilot has means to grasp a nut.

17. The structure recited in claim 9 and further including means on said pilot for grasping a fastener from said fastener feeding solenoid means and transferring it to the workpiece.

18. The structure recited in claim 17 and further including spring biased punch and anvil pilots to assist in transferring the fastener to the workpiece.

19. The structure recited in claim 11 and further including a high pressure air regulator valve, and switch means connected to said first timer for halting the cycle after the third solenoid actuates so that the operator may adjust the high pressure regulator valve to the air pressure required to properly clinch the particular fastener and workpiece combination.

References Cited
UNITED STATES PATENTS 3,108,368 10/1963 Steward.
3,381,362 5/1968 Church et al. _____ 29—432 X THOMAS H. EAGER, Primary Examiner U.S. Cl. X.R.

29—211, 432.2